(12) United States Patent
Sakhnini et al.

(10) Patent No.: US 11,606,763 B2
(45) Date of Patent: Mar. 14, 2023

(54) SYNCHRONIZATION SIGNAL BLOCK AND CONTROL RESOURCE SET MULTIPLEXING IN WIRELESS COMMUNICATIONS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 87 days.

(21) Appl. No.: 17/175,444

(22) Filed: Feb. 12, 2021

(65) Prior Publication Data

US 2022/0264489 A1 Aug. 18, 2022

(51) Int. Cl.
*H04W 56/00* (2009.01)
*H04L 27/26* (2006.01)
(Continued)

(52) U.S. Cl.
CPC ....... *H04W 56/001* (2013.01); *H04L 27/2607* (2013.01); *H04L 27/2636* (2013.01);
(Continued)

(58) Field of Classification Search
CPC .......... H04W 56/001; H04W 72/0453; H04W 72/046; H04W 72/0493; H04L 27/2607; H04L 27/2636
(Continued)

(56) References Cited

U.S. PATENT DOCUMENTS

2019/0150121 A1* 5/2019 Abdoli ................. H04L 5/0053
370/329
2019/0223084 A1* 7/2019 John Wilson ....... H04L 27/2666
(Continued)

OTHER PUBLICATIONS

"5G NR Physical Layer Procedures for Control (3GPP TS 38.213 Version 16.4.0 Release 16)", ETSI Technical Specification, European Telecommunications Standards Institute (ETSI), 650, Route Des Lucioles, F-06921 Sophia-Antipolis Cedex, France, vol. 3GPP RAN, No. V16.4.0, Jan. 26, 2021 (Jan. 26, 2021), pp. 1-185, XP014395869, Retrieved from the Internet: URL: http://www.etsi.org/deliver/etsi_ts/138200_138299/138213/16.04.00_60/ts_138213v160400p.pdf. [Retrieved on Jan. 26, 2021] p. 144.
(Continued)

*Primary Examiner* — Sai Ming Chan
(74) *Attorney, Agent, or Firm* — Holland & Hart LLP; Nerrie M. Zohn

(57) ABSTRACT

Methods, systems, and devices for wireless communications provide techniques for multiplexing, in a frequency domain, a synchronization signal block (SSB) and a control resource set (CORESET) to form a multiplexed block that is transmitted using a set of symbols. A base station may transmit multiple multiplexed blocks using multiple different beams with a switching gap provided between each multiplexed block that allows for switching of radio frequency (RF) components between different beams. The switching gap is longer than a duration of a cyclic prefix (CP) that is associated with each symbol of the set of symbols of each multiplexed block. Within one or more of the multiplexed blocks, an associated SSB may use a different waveform than the CORESET. The multiplexed blocks may use a common reference signal for both the SSB and CORESET.

24 Claims, 20 Drawing Sheets

(51) Int. Cl.
*H04W 72/0453* (2023.01)
*H04W 72/044* (2023.01)
*H04W 72/04* (2023.01)

(52) U.S. Cl.
CPC ..... *H04W 72/046* (2013.01); *H04W 72/0453* (2013.01); *H04W 72/0493* (2013.01)

(58) Field of Classification Search
USPC .......................................................... 370/329
See application file for complete search history.

(56) References Cited

U.S. PATENT DOCUMENTS

| | | | |
|---|---|---|---|
| 2020/0295896 A1 | 9/2020 | Xiong et al. | |
| 2020/0313835 A1 | 10/2020 | Ji et al. | |
| 2020/0359384 A1* | 11/2020 | Da | H04W 76/28 |
| 2020/0396744 A1* | 12/2020 | Xiong | H04W 72/0446 |
| 2020/0412590 A1 | 12/2020 | Akkarakaran et al. | |
| 2021/0105122 A1* | 4/2021 | Xiong | H04J 3/16 |
| 2021/0320832 A1* | 10/2021 | Xiao | H04L 5/0007 |
| 2021/0360510 A1* | 11/2021 | Zheng | H04L 5/0012 |

OTHER PUBLICATIONS

Moderator (Intel Corporation): "[103-e-NR-52-71-Waveform-Changes] Discussions Summary #5", 3GPP Draft, 3GPP TSG RAN WG1 Meeting #103-e, R1 -2009717, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 13, 2020 (Nov. 13, 2020), XP051954366, 199 Pages, Retrieved from the Internet: URL: https://ftp.3gpp.org/tsg_ran/WG1_RL1/TSGR1_103-e/Docs/R1-2009717.zip R1-2009717 NR 60ghz Email Discussion-1-v212.docx [Retrieved on Nov. 13, 2020] p. 84.

NTT Docomo, Inc., "Discussion on Remaining Details on RMSI Delivery", 3GPP Draft, 3GPP TSG RAN WG1 Meeting 90bis, R1-1718181, Discussion on Remaining Details on RMSI Delivery Final, 3rd Generation Partnership Project (3GPP), Mobile Competence Centre, 650, Route Des Lucioles, F-06921 Sophia-Antipolis, vol. RAN WG1, No. Prague, CZ, Oct. 9, 2017-Oct. 13, 2017, Oct. 8, 2017 (Oct. 8, 2017), XP051341363, 7 Pages, Retrieved from the Internet: URL: http://www.3gpp.org/ftp/Meetings_3GPP_SYNC/RAN1/Docs/ [Retrieved on Oct. 8, 2017] paragraph [02.1].

Partial International Search Report—PCT/US2022/011811—ISA/EPO—dated Apr. 19, 2022.

"5G, NR, Physical Channels and Modulation (3GPP TS 38.211 Version 16.4.0 Release 16)", ETSI Technical Specification, European Telecommunications Standards Institute, 650, Route Des Lucioles, F-06921 Sophia-Antipolis, France, vol. 3GPP RAN, No. V16.4.0, Jan. 26, 2021, pp. 1-137, XP014395861, Tables 7.4.3.1-1.

Intel Corporation: "Remaining Details of NR-PDCCH Structure", 3GPP TSG-RAN WG1 90bis, R1-1717378, Intel PDCCHSTRUCT, 3rd Generation Partnership Project, Mobile Competence Centre, 650, Route Des Lucioles, F-06921 Sophia-Antipolis Cedex, France vol. RAN WG1, No. Prague, CZ, Sep. 9, 2017-Sep. 13, 2017, Oct. 3, 2017, 5 Pages, XP051352601, Paragraph [02.2].

International Search Report and Written Opinion—PCT/US2022/011811—ISA/EPO—dated Aug. 25, 2022.

Lin X., et al., "5G New Radio: Unveiling the Essentials of the Next Generation Wireless Access Technology", IEEE Communications Standards Magazine 3.3, IEEE, vol. 3, No. 3, Sep. 1, 2019, pp. 30-37, XP011759193, ISSN: 2471-2825, DOI:10.1109/MCOMSTD.001.1800036, Figure 5.

* cited by examiner

SYNCHRONIZATION SIGNAL BLOCK AND CONTROL RESOURCE SET MULTIPLEXING IN WIRELESS COMMUNICATIONS

FIELD OF TECHNOLOGY

The following relates to wireless communications, including synchronization signal block and control resource set multiplexing in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE and a base station may support communications using multiple beams. In such systems, beam selection techniques may include transmission of multiple synchronization signal blocks (SSBs) by the base station on multiple different beams, which may be monitored at the UE for selection of one or more beams that provide suitable channel quality for communications. For a selected beam, the UE may further monitor for a control resource set (CORESET) that may provide an indication of resources containing system information (e.g., CORESET0 that may provide resources of a system information block (SIB)). Techniques for enhancing the transmission and reception of SSB and CORESET communications may be desirable for improving overall system efficiency and reliability.

SUMMARY

The described techniques relate to improved methods, systems, devices, and apparatuses that support synchronization signal block (SSB) and control resource set (CORESET) multiplexing in wireless communications. Various aspects of the present disclosure provide techniques for multiplexing, in a frequency domain, a SSB and a CORESET to form a multiplexed block that may be transmitted using a set of symbols. A base station may transmit multiple multiplexed blocks using multiple different beams (e.g., in a SSB burst) and a switching gap may be provided between each multiplexed block that allows for switching of components between different beams. In some cases, the switching gap is longer than a duration of a cyclic prefix (CP) that is associated with each symbol of the set of symbols of each multiplexed block. In some cases, within one or more of the multiplexed blocks, an associated SSB may use a different waveform than the CORESET (e.g., the SSB may use an orthogonal frequency division multiplexing (OFDM) waveform and the CORESET may use a discrete Fourier transform spread OFDM (DFT-s-OFDM) waveform). In some cases, the multiplexed blocks may use a common reference signal for both the SSB and CORESET. In other cases, the SSB and CORESET may use independent reference signals.

A method for wireless communication at a user equipment (UE) is described. The method may include monitoring a first beam for a first multiplexed block that includes a first synchronization signal block that is multiplexed in a frequency domain with a first control resource set, the first multiplexed block including a first set of symbols that each have an associated cyclic prefix, monitoring a second beam, subsequent to a switching gap following the first multiplexed block, for a second multiplexed block that includes a second synchronization signal block that is multiplexed in the frequency domain with a second control resource set, the second multiplexed block including a second set of symbols that each have an associated cyclic prefix, where an initial cyclic prefix of an initial symbol of the second multiplexed block starts after the switching gap, and decoding one or more of the first multiplexed block or the second multiplexed block.

An apparatus for wireless communication at a UE is described. The apparatus may include a processor, memory coupled with the processor, and instructions stored in the memory. The instructions may be executable by the processor to cause the apparatus to monitor a first beam for a first multiplexed block that includes a first synchronization signal block that is multiplexed in a frequency domain with a first control resource set, the first multiplexed block including a first set of symbols that each have an associated cyclic prefix, monitor a second beam, subsequent to a switching gap following the first multiplexed block, for a second multiplexed block that includes a second synchronization signal block that is multiplexed in the frequency domain with a second control resource set, the second multiplexed block including a second set of symbols that each have an associated cyclic prefix, where an initial cyclic prefix of an initial symbol of the second multiplexed block starts after the switching gap, and decode one or more of the first multiplexed block or the second multiplexed block.

Another apparatus for wireless communication at a UE is described. The apparatus may include means for monitoring a first beam for a first multiplexed block that includes a first synchronization signal block that is multiplexed in a frequency domain with a first control resource set, the first multiplexed block including a first set of symbols that each have an associated cyclic prefix, means for monitoring a second beam, subsequent to a switching gap following the first multiplexed block, for a second multiplexed block that includes a second synchronization signal block that is multiplexed in the frequency domain with a second control resource set, the second multiplexed block including a second set of symbols that each have an associated cyclic prefix, where an initial cyclic prefix of an initial symbol of the second multiplexed block starts after the switching gap, and means for decoding one or more of the first multiplexed block or the second multiplexed block.

A non-transitory computer-readable medium storing code for wireless communication at a UE is described. The code may include instructions executable by a processor to monitor a first beam for a first multiplexed block that includes a first synchronization signal block that is multiplexed in a frequency domain with a first control resource set, the first multiplexed block including a first set of symbols that each have an associated cyclic prefix, monitor a second beam, subsequent to a switching gap following the first multiplexed block, for a second multiplexed block that includes a second synchronization signal block that is multiplexed in the frequency domain with a second control resource set, the second multiplexed block including a second set of symbols that each have an associated cyclic prefix, where an initial cyclic prefix of an initial symbol of the second multiplexed block starts after the switching gap, and decode one or more of the first multiplexed block or the second multiplexed block.

In some examples of the method, apparatuses, and non-transitory computer-readable medium described herein, the first synchronization signal block may be transmitted using a first waveform, and the first control resource set may be transmitted using a second waveform that is a different waveform than the first waveform. In some examples of the method, apparatuses, and non-transitory computer-readable medium described herein, the first waveform may be an orthogonal frequency division multiplexing (OFDM) waveform or a discrete Fourier transform spread OFDM (DFT-s-OFDM) waveform, and the second waveform may be an OFDM waveform or a DFT-s-OFDM waveform.

Some examples of the method, apparatuses, and non-transitory computer-readable medium described herein may further include operations, features, means, or instructions for determining one or more of a frequency allocation, a bandwidth, or a time duration of the first control resource set based on one or more predetermined values or an indication provided in an information block within the first synchronization signal block. In some examples of the method, apparatuses, and non-transitory computer-readable medium described herein, each of the first synchronization signal block and the first control resource set, and each of the second synchronization signal block and the second control resource set, are multiplexed in a continuous frequency domain allocation.

Some examples of the method, apparatuses, and non-transitory computer-readable medium described herein may further include operations, features, means, or instructions for estimating a channel associated with the first synchronization signal block and the first control resource set based on a first reference signal contained in the first multiplexed block, where the first reference signal spans frequency resources associated with the first synchronization signal block and the first control resource set. In some examples of the method, apparatuses, and non-transitory computer-readable medium described herein, the first reference signal spans a fixed frequency bandwidth associated with the first multiplexed block. Some examples of the method, apparatuses, and non-transitory computer-readable medium described herein may further include operations, features, means, or instructions for blind decoding two or more frequency bandwidth candidates within the first multiplexed block to identify a frequency bandwidth of the first reference signal. Some examples of the method, apparatuses, and non-transitory computer-readable medium described herein may further include operations, features, means, or instructions for identifying a frequency bandwidth that contains the first reference signal based on an indication provided by a synchronization signal within the first synchronization signal block.

In some examples of the method, apparatuses, and non-transitory computer-readable medium described herein, the estimating may include operations, features, means, or instructions for estimating the channel associated with the first synchronization signal block based on a first portion of the first reference signal that spans a first frequency bandwidth associated with the first synchronization signal block, determining, based at least in part information from the first synchronization signal block, a second frequency bandwidth associated with the first control resource set, and estimating the channel associated with the first control resource set based on a second portion of the first reference signal that spans the second frequency bandwidth.

Some examples of the method, apparatuses, and non-transitory computer-readable medium described herein may further include operations, features, means, or instructions for estimating a first channel associated with the first synchronization signal block based on a first reference signal in a first frequency bandwidth associated with the first synchronization signal block and estimating a second channel associated with the first control resource set based on a second reference signal in a second frequency bandwidth associated with the first control resource set.

Some examples of the method, apparatuses, and non-transitory computer-readable medium described herein may further include operations, features, means, or instructions for estimating a channel associated with each multiplexed block based on a reference signal in a dedicated discrete Fourier transmission spread orthogonal frequency division multiplexing (DFT-s-ODFM) symbol within the associated multiplexed block. Some examples of the method, apparatuses, and non-transitory computer-readable medium described herein may further include operations, features, means, or instructions for estimating a channel associated with each multiplexed block based on a reference signal that is located in a subset of subcarriers within a symbol of the associated multiplexed block. Some examples of the method, apparatuses, and non-transitory computer-readable medium described herein may further include operations, features, means, or instructions for estimating a channel associated with each multiplexed block based on a reference signal that is located in a subset of time domain symbols of a set of time domain symbols that are generated after a fast Fourier transform (FFT) and inverse discrete Fourier transform of one or more received symbols of the associated multiplexed block.

A method for wireless communication at a base station is described. The method may include multiplexing, in a frequency domain for a first beam, a first synchronization signal block and a first control resource set into a first multiplexed block that includes a first set of symbols that each have an associated cyclic prefix, multiplexing, in the frequency domain for a second beam, a second synchronization signal block and a second control resource set into a second multiplexed block that includes a second set of symbols that each have an associated cyclic prefix, transmitting the first multiplexed block in the first set of symbols, and transmitting, subsequent to a switching gap following the first set of symbols, the second multiplexed block in the second set of symbols, where an initial cyclic prefix of an initial symbol of the second multiplexed block starts after the switching gap.

An apparatus for wireless communication at a base station is described. The apparatus may include a processor, memory coupled with the processor, and instructions stored in the memory. The instructions may be executable by the processor to cause the apparatus to multiplexing, in a frequency domain for a first beam, a first synchronization signal block and a first control resource set into a first multiplexed block that includes a first set of symbols that each have an associated cyclic prefix, multiplexing, in the frequency domain for a second beam, a second synchronization signal block and a second control resource set into a second multiplexed block that includes a second set of symbols that each have an associated cyclic prefix, transmit the first multiplexed block in the first set of symbols, and transmit, subsequent to a switching gap following the first set of symbols, the second multiplexed block in the second set of symbols, where an initial cyclic prefix of an initial symbol of the second multiplexed block starts after the switching gap.

Another apparatus for wireless communication at a base station is described. The apparatus may include means for multiplexing, in a frequency domain for a first beam, a first synchronization signal block and a first control resource set into a first multiplexed block that includes a first set of symbols that each have an associated cyclic prefix, means for multiplexing, in the frequency domain for a second beam, a second synchronization signal block and a second control resource set into a second multiplexed block that includes a second set of symbols that each have an associated cyclic prefix, means for transmitting the first multiplexed block in the first set of symbols, and means for transmitting, subsequent to a switching gap following the first set of symbols, the second multiplexed block in the second set of symbols, where an initial cyclic prefix of an initial symbol of the second multiplexed block starts after the switching gap.

A non-transitory computer-readable medium storing code for wireless communication at a base station is described. The code may include instructions executable by a processor to multiplexing, in a frequency domain for a first beam, a first synchronization signal block and a first control resource set into a first multiplexed block that includes a first set of symbols that each have an associated cyclic prefix, multiplexing, in the frequency domain for a second beam, a second synchronization signal block and a second control resource set into a second multiplexed block that includes a second set of symbols that each have an associated cyclic prefix, transmit the first multiplexed block in the first set of symbols, and transmit, subsequent to a switching gap following the first set of symbols, the second multiplexed block in the second set of symbols, where an initial cyclic prefix of an initial symbol of the second multiplexed block starts after the switching gap.

In some examples of the method, apparatuses, and non-transitory computer-readable medium described herein, the first synchronization signal block may be transmitted using a first waveform, and the first control resource set may be transmitted using a second waveform that is a different waveform than the first waveform, and where the first waveform may be an OFDM waveform or a DFT-s-OFDM waveform, and the second waveform may be an OFDM waveform or a DFT-s-OFDM waveform.

Some examples of the method, apparatuses, and non-transitory computer-readable medium described herein may further include operations, features, means, or instructions for determining one or more of a frequency allocation, a bandwidth, or a time duration of the first control resource set based on one or more predetermined values or an indication provided in an information block within the first synchronization signal block, and where the associated synchronization signal block and control resource set of each associated multiplexed block is multiplexed in a continuous frequency domain allocation.

In some examples of the method, apparatuses, and non-transitory computer-readable medium described herein, the transmitting the first multiplexed block may include operations, features, means, or instructions for transmitting a first reference signal in the first multiplexed block, where the first reference signal spans frequency resources associated with the first synchronization signal block and the first control resource set. In some examples of the method, apparatuses, and non-transitory computer-readable medium described herein, the first reference signal spans a fixed frequency bandwidth associated with the first multiplexed block. Some examples of the method, apparatuses, and non-transitory computer-readable medium described herein may further include operations, features, means, or instructions for selecting a frequency bandwidth for the first reference signal from two or more blind decoding frequency bandwidth candidates within the first multiplexed block. Some examples of the method, apparatuses, and non-transitory computer-readable medium described herein may further include operations, features, means, or instructions for selecting a frequency bandwidth for the first reference signal from two or more available frequency bandwidths within the first multiplexed block and transmitting an indication of the frequency bandwidth for the first reference signal in a synchronization signal within the first synchronization signal block.

In some examples of the method, apparatuses, and non-transitory computer-readable medium described herein, the transmitting the first multiplexed block may include operations, features, means, or instructions for transmitting a first reference signal in a first frequency bandwidth associated with the first synchronization signal block and transmitting a second reference signal in a second frequency bandwidth associated with the first control resource set.

Some examples of the method, apparatuses, and non-transitory computer-readable medium described herein may further include operations, features, means, or instructions for transmitting a reference signal in each multiplexed block, where the reference signal may be transmitted in, a dedicated DFT-s-ODFM symbol within the associated multiplexed block, a subset of subcarriers within one or more symbols of the associated multiplexed block, or a subset of time domain symbols inserted into a set of time domain symbols prior to a discrete Fourier transform of the associated multiplexed block.

DETAILED DESCRIPTION

Figure 1:
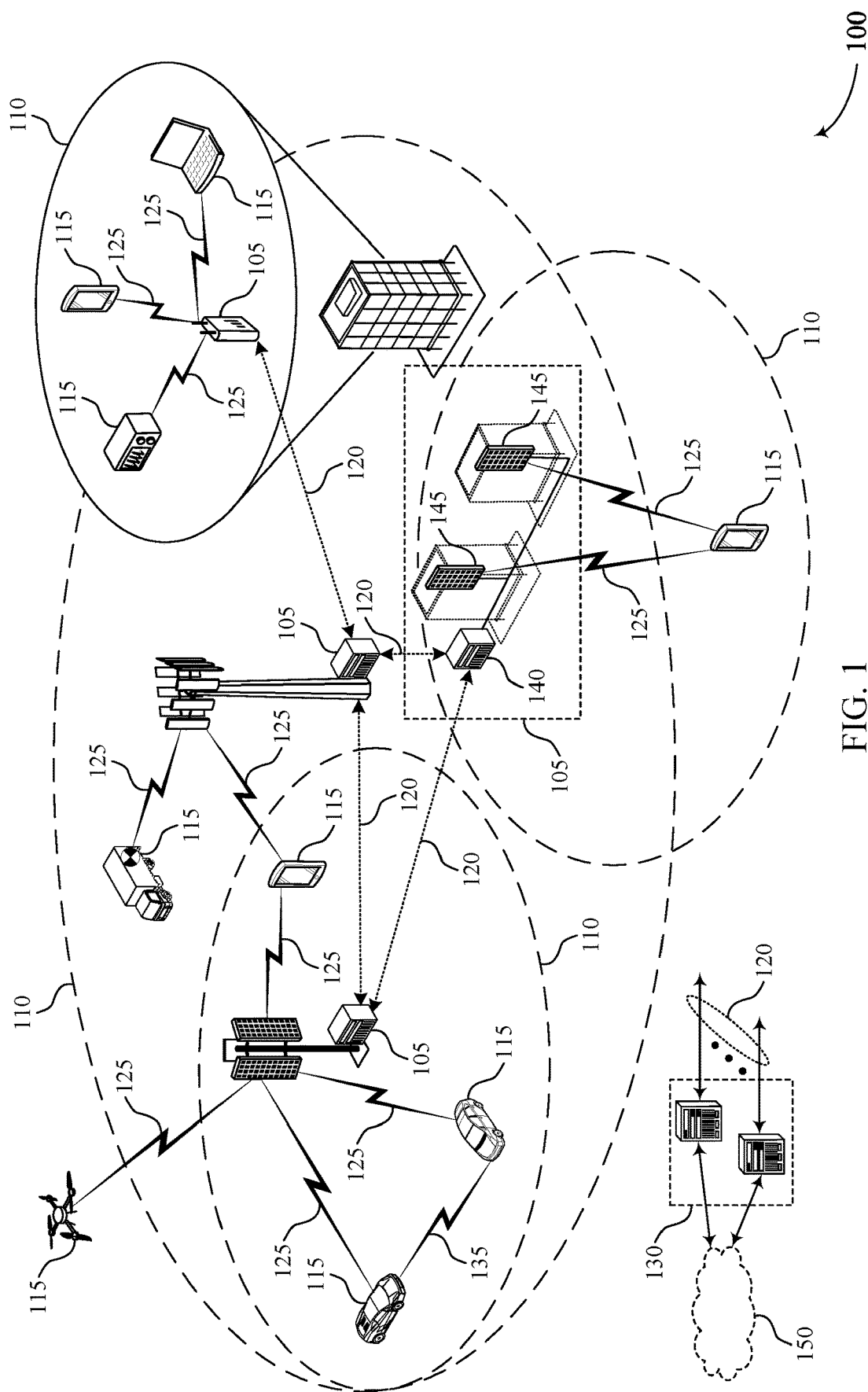
FIG. 1 illustrates an example of a wireless communications system that supports synchronization signal block (SSB) and control resource set (CORESET) multiplexing in wireless communications in accordance with aspects of the present disclosure.

In some wireless communications systems, a UE and a base station may support communications using multiple beams. In such systems, beam selection techniques may include transmission of multiple synchronization signal blocks (SSBs) by the base station on multiple different beams, which may be monitored at the UE for selection of one or more beams that provide suitable channel quality for communications. Multiple SSBs may be transmitted in an SSB burst in which consecutive SSBs are transmitted and radio frequency (RF) components (e.g., analog phase shift and gain components associated with different antenna elements of an antenna panel or antenna array) are switched according to the particular beam of the different beams. A switching time for making changes to the RF components for each beam switch may correspond to a time for signaling the switch plus a time to complete the tuning at the particular RF component. In some cases, SSBs may be transmitted using a set of orthogonal frequency division multiplexing (OFDM) symbols, and each symbol may include a cyclic prefix (CP) in which a copy of a last portion of the OFDM symbol is prepended at the start of the OFDM symbol (e.g., to provide a guard period for inter-symbol interference mitigation). The CP in some cases may provide sufficient time for the beam switching, allowing for switching of the RF components prior to the end of the CP. However, a duration of symbols (and the corresponding CP) is inversely proportional to a subcarrier spacing (SCS) that is used for communications, and in cases where the SCS is relatively large the associated CP may not provide sufficient time for beam switching.

In cases where the CP does not provide sufficient time for beam switching (e.g., due to relatively large SCS, a relatively large switching time for particular RF components, etc.), an additional switching gap may be provided such that sufficient time is provided for beam switching. Such a switching gap, however, adds additional overhead and reduces overall system efficiency. Further, in addition to SSB transmissions in which beam switching is performed between consecutive different SSBs, a base station may transmit multiple control resource sets (CORESETs) on each of the different beams that may include system information (e.g., CORESET #0 that a UE may use to derive system information block 1 (SIB1) information) that a UE may use for communications with the base station using that particular beam. Thus, multiple CORESETs may also be transmitted on multiple beams, and in the event that the CORESETs are transmitted using different time resources than the SSBs, additional switching gaps may be needed in cases where the CP does not provide sufficient time for beam switching. Accordingly, in such cases the addition of switching gaps for both SSB and CORESET transmissions on multiple beams may add further overhead. In some cases SSBs and CORESETs may be multiplexed in the frequency domain and transmitted using the same time resources on a same beam.

In accordance with various aspects discussed herein, SSBs and CORESETs may be multiplexed in the frequency domain to provide a multiplexed block and transmitted using a set of symbols on a particular beam. Further, a switching gap in addition to an initial CP of an initial symbol of the set of symbols may be located between consecutive sets of symbols to provide sufficient switching time for RF components to different beams for the different SSBs and CORESET transmissions. In some cases, within one or more multiplexed blocks, an associated SSB may use a different waveform than the CORESET (e.g., the SSB may use an OFDM waveform and the CORESET may use a discrete Fourier transform spread OFDM (DFT-s-OFDM) waveform). In some cases, the multiplexed blocks may use a common reference signal for both the SSB and CORESET. In other cases, the SSB and CORESET may use independent reference signals. In cases where a common reference signal is used, channel estimation based on the reference signal to decode the SSB (e.g., to decode a physical broadcast channel (PBCH) that is transmitted in the SSB) may use a reference signal bandwidth that is a predetermined fixed bandwidth, that may be selected from a set of available bandwidths and blind decoded at a UE, that may be indicated by a synchronization signal in the SSB, or may be only a portion of the bandwidth that overlaps with the SSB. In some cases, the common reference signal may be transmitted in a dedicated DFT-s-OFDM symbol, may be transmitted in a number of subcarriers within a symbol of the associated multiplexed block, or may be located in a subset of time domain symbols inserted into a set of time domain symbols prior to a DFT of the associated multiplexed block.

Particular aspects of the subject matter described herein may be implemented to realize one or more advantages. For example, described techniques may allow for a single switching gap between multiplexed blocks that include both a SSB and a CORESET, and thereby enhance system efficiency. Further, described techniques may provide for flexibility in selection of different waveforms within a multiplexed block for SSB and CORESET transmissions. Additionally, or alternatively, described techniques may provide for enhanced channel estimation using a common reference signal that spans both the SSB and CORESET. Such techniques may thereby reduce overhead associated with switching gaps, and improve reliability of wireless communications, among other advantages. As such, supported techniques may include improved network operations and, in some examples, may promote network efficiencies and overall user experience, among other benefits.

Aspects of the disclosure are initially described in the context of wireless communications systems. Examples of multiplexed blocks that include SSBs and CORESETs, and related process flows, are then discussed. Aspects of the disclosure are further illustrated by and described with reference to apparatus diagrams, system diagrams, and flowcharts that relate to SSB and CORESET multiplexing in wireless communications.

FIG. 1 illustrates an example of a wireless communications system 100 that supports SSB and CORESET multiplexing in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a base station 105 may multiplex, in a frequency domain, a SSB and a CORESET to form a multiplexed block that is transmitted using a set of symbols. The base station 105 may transmit multiple multiplexed blocks using multiple different beams (e.g., in a SSB burst) and a switching gap may be provided between each multiplexed block that allows for switching of components between different beams. In some cases, the switching gap is longer than a duration of a CP that is associated with an initial symbol of the set of symbols of each multiplexed block. In some cases, within one or more of the multiplexed blocks, an associated SSB may use a different waveform than the CORESET (e.g., the SSB may use an OFDM waveform and the CORESET may use a DFT-s-OFDM waveform). In some cases, the multiplexed blocks may use a common reference signal for both the SSB and CORESET. In other cases, the SSB and CORESET may use independent reference signals.

Figure 2:
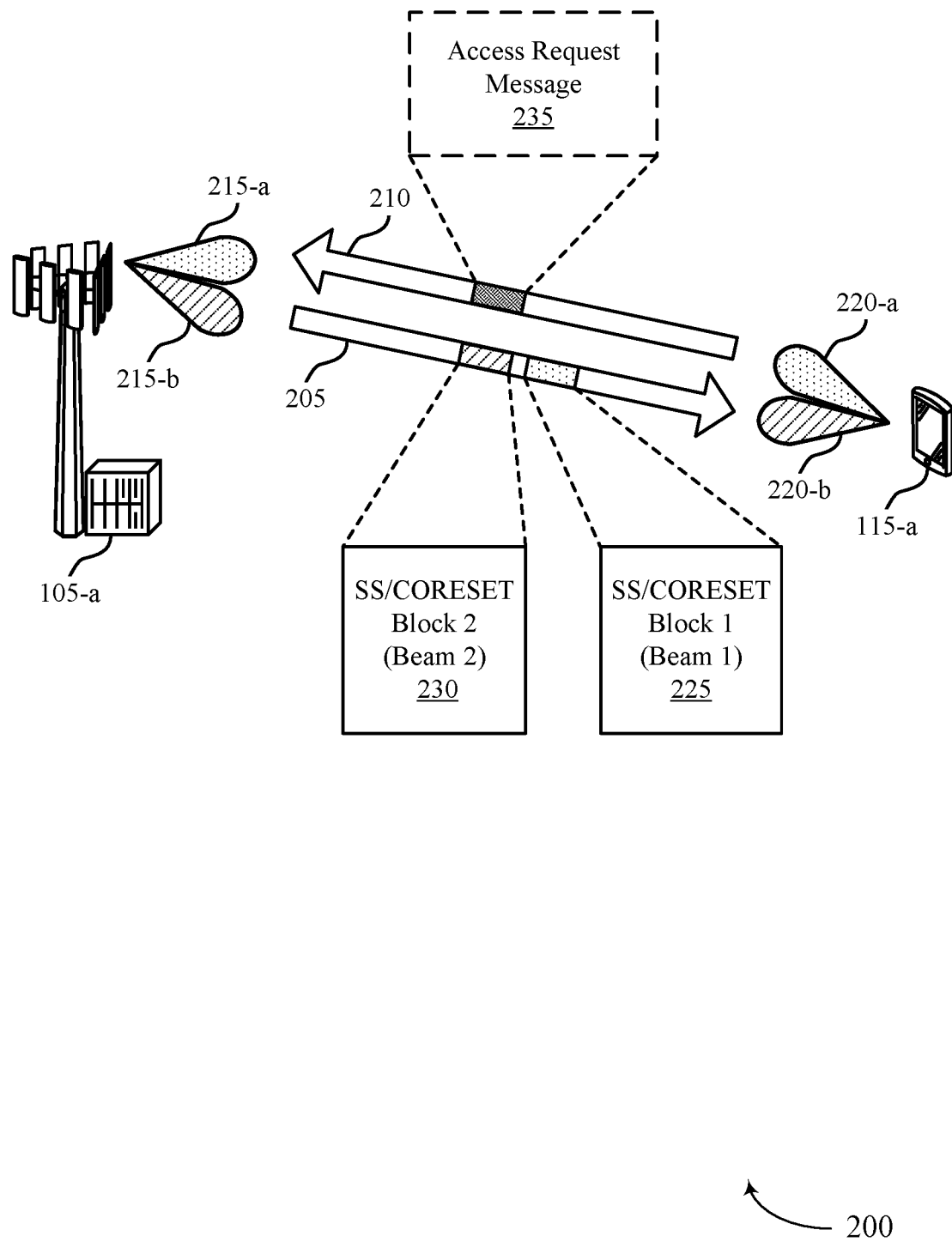
FIG. 2 illustrates an example of a wireless communications system that supports SSB and CORESET multiplexing in wireless communications in accordance with aspects of the present disclosure.

FIG. 2 illustrates an example of a wireless communications system 200 that supports SSB and CORESET multiplexing in wireless communications in accordance with aspects of the present disclosure. In some examples, wireless communications system 200 may implement aspects of wireless communications system 100. Wireless communications system 200 may include a base station 105-a and a UE 115-a, which may be examples of the corresponding devices described with reference to FIG. 1. Base station 105-a and UE 115-a may communicate using one or more beams 215, and the base station 105-a may engage in a beam sweeping operation to establish an active beam pair link with UE 115-a that may be used for downlink communications 205 and uplink communications 210.

In some examples, base station 105-a may engage in a beam sweeping operation to establish an active beam with UE 115-a. For example, base station 105-a may transmit a burst of SSBs using multiple beams 215 in which synchronization signals (e.g. a primary synchronization signal (PSS), a secondary synchronization signal (SSS)) and PBCH transmissions may be transmitted in the corresponding beam directions. As discussed herein, for each beam 215, an SSB may be frequency division multiplexed with a corresponding CORESET and transmitted in a multiplexed block, which may be referred to as a SS/PBCH/CORESET block (SSCB). In the example of FIG. 2, the base station 105-a may transmit a first SSCB 225 using a first beam 215-a, and may transmit a second SSCB 230 using a second beam 215-b. In some cases, a switching gap may be located between the first SSCB 225 and the second SSCB 230, in order to allow sufficient time for switching of RF components between the first beam 215-a and the second beam 215-b. The UE 115-a may monitor for the multiplexed blocks using one or more receive beams 220, which may include a first receive beam 220-a and a second receive beam 220-b. In some cases, the UE 115-a may transmit an access request message 235 responsive to receipt and decoding of a SSB and CORESET in one or more of the multiplexed blocks.

In some cases, the burst of SSBs may be provided by the base station 105-a for, among other uses, an initial cell search by the UE 115-a, and in such cases the access request message 235 may be a random access request message. The SSBs, in some examples, may span four OFDM symbols, with one symbol for PSS, two symbols for PBCH, and one symbol with SSS and PBCH that are frequency division multiplexed. Further, the CORESETs corresponding to one or more of the SSBs may provide a grant for a SIB (e.g., a grant for a SIB1 PDSCH) that is sent using PDCCH type0 on search space set 0 on CORESET0. The multiplexed blocks may use SCSs that range from relatively low values of 15 kHz or 30 kHz to relatively high values such as approaching one MHz and higher. For example, some mmW bands, which may be referred to as frequency range 2 (FR2) spanning 24.25 GHz to 52.6 GHz, may use SCSs of 120 kHz or 240 kHz. Further, in some higher bands (e.g., FR4 that spans 52.6 GHz to 71 GHz) SCSs may be increased (e.g., 960 kHz, 1920 kHz, 3840 kHz) to mitigate phase noise and to increase the overall channelization bandwidth with a manageable FFT size.

As discussed herein, as SCS increases the symbol time and CP decreases proportionally. Table 1 shows exemplary CP times ($T_{cp}$) and symbol times ($T_{symb}$) for multiple different SCSs that are identified by SCS indices ($\mu$).

TABLE 1

| $\mu$ | 0 | 1 | 2 | 3 | 4 | 5 | 6 | 7 | 8 |
|---|---|---|---|---|---|---|---|---|---|
| SCS (kHz) | 15 | 30 | 60 | 120 | 240 | 480 | 960 | 1920 | 3840 |
| $T_{cp}$ (ns) | 4687.5 | 2343.8 | 1171.9 | 585.9 | 293.0 | 146.5 | 73.2 | 36.6 | 18.3 |
| $T_{symb}$ (ns) | 66666.7 | 33333.3 | 16666.7 | 8333.3 | 4166.7 | 2083.3 | 1041.7 | 520.8 | 260.4 |

In some cases, RF components within transmit and receive circuitry may take time to stabilize when being switched between beams. For example, RF components may take approximately 100 ns to perform switching between different beams. In such cases, the CP time for higher SCSs (e.g., for SCSs at or above 960 kHz in the example of Table 1) may not be sufficient to allow for beam switching between consecutive symbols, and the switching gap may be provided between consecutive symbols that use different beams 215 (e.g., between the first SSCB 225 and the second SSCB 230 in the example of FIG. 2), to allow sufficient time for switching of RF components.

In some cases, the insertion of switching gaps may be enabled or disabled based on a SCS threshold value. Further, in some cases, a duration of the switching gap may be dependent upon the SCS to provide a larger switching gap when the SCS is larger and a lower switching gap or no switching gap for relatively low SCSs (e.g., a 90 ns switching gap for a SCS of 3840 kHz and a 30 ns switching gap for a SCS of 960 kHz, and no switching gap for SCSs below 960 kHz). In some cases, the length of the switching gap may correspond to a duration of an integer number of symbols. In other cases, the length of the switching gap may be a specified time duration (e.g., 50 ns), may correspond to fractional symbol durations, or may correspond to a duration of a symbol of a different SCS than the SCS used to transmit the first SSCB 225 or second SSCB 230.

Figure 3:
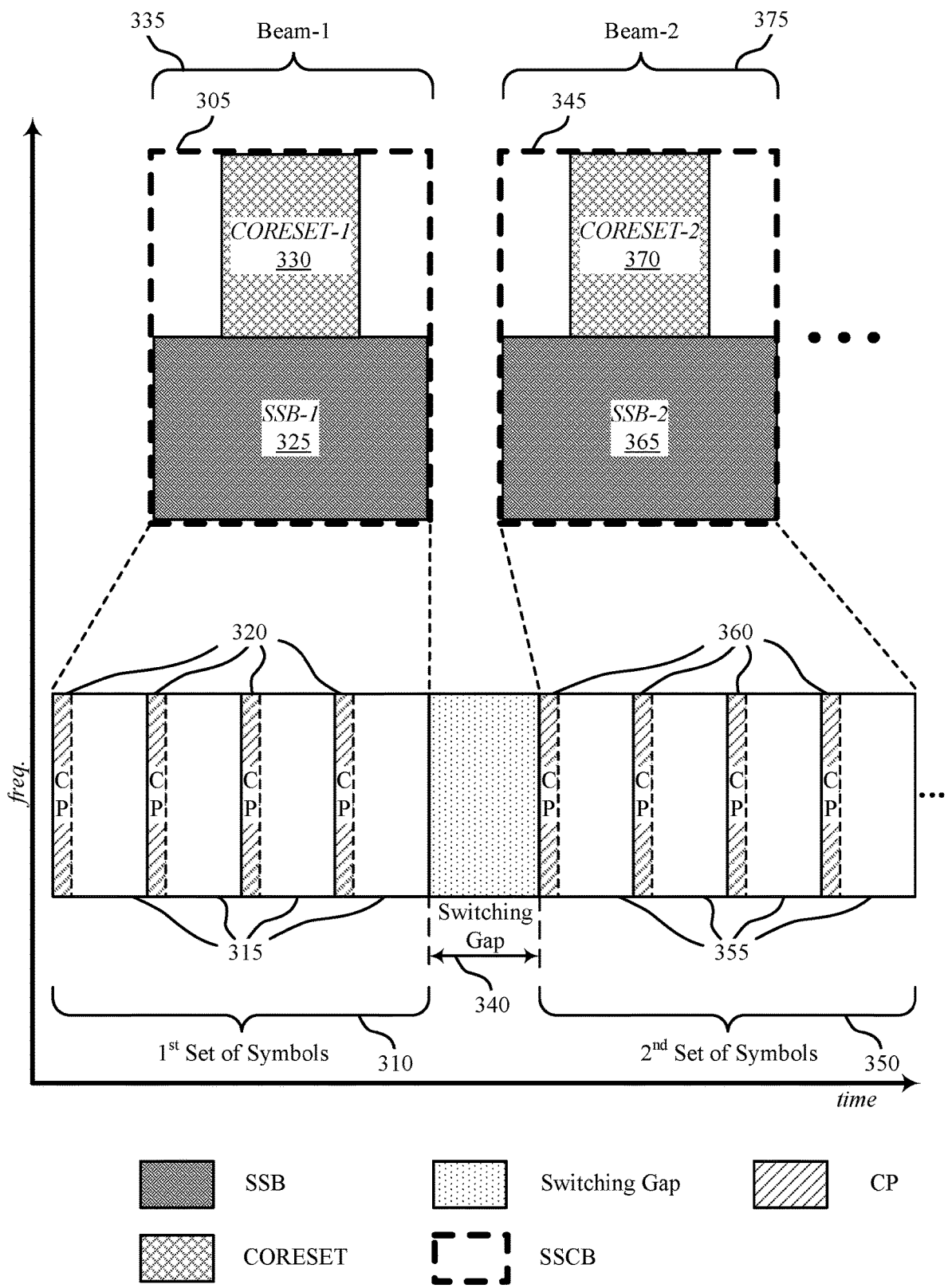
FIG. 3 through 5 illustrate examples of wireless resources for multiplexed blocks that support SSB and CORESET multiplexing in wireless communications in accordance with aspects of the present disclosure.

FIG. 3 illustrates an example of wireless resources 300 for multiplexed blocks that support SSB and CORESET multiplexing in wireless communications in accordance with aspects of the present disclosure. In some examples, wireless resources 300 may be used in aspects of wireless communications system 100 or 200. In this example, a first SSCB 305 may be transmitted in a first set of symbols 310, and a second SSCB 345 may be transmitted in a second set of symbols 350.

The first set of symbols 310 may include multiple symbols 315 that each have an associated CP 320. As discussed herein, a time duration of the symbols 315 and CPs 320 may be proportional to a SCS that is used for communications between a base station and one or more UEs (e.g., base stations 105 and UEs 115 of FIG. 1 or 2). The first SSCB 305 may include a first SSB 325 and a first CORESET 330 (e.g., a first CORESET0 for the communications using first beam 335), which may be frequency division multiplexed in the first set of symbols 310 and transmitted using the first beam 335. A switching gap 340 may be provided between the first SSCB 305 and the second SSCB 345. As discussed herein, a duration of the switching gap 340 may provide RF components sufficient time to switch between different beams. The second set of symbols 350 may include multiple symbols 355 that each have an associated CP 360 that have a time duration proportional to the SCS that is used for the second SSCB 345. The second SSCB 345 may include a second SSB 365 and a second CORESET 370 (e.g., a second CORESET0 for communications using second beam 375), which may be frequency division multiplexed in the second set of symbols 350 and transmitted using the second beam 375. Additional switching gaps and SSCBs may be transmitted, depending upon a number of SSBs that may be transmitted in an SSB burst.

As discussed herein, multiplexing the SSBs 325 and 365 in the frequency domain with the CORESETs 330 and 370 within the respective first set of symbols 310 and second set of symbols 350 allows a single switching gap 340 to be provided for switching between the first beam 335 and the second beam 375, instead of multiple switching gaps 340 that would be needed in the event that one or more symbols of a different beam were present between SSB and CORESET transmissions for a particular beam. In some cases, an OFDM waveform or a DFT-s-OFDM waveform may be used for transmission of the multiplexed blocks. In some cases, different waveforms may be used within a multiplexed block. For example, the first SSB 325 may use an OFDM waveform, and the first CORESET 330 may use a DFT-s-OFDM waveform. While various examples discussed herein may use OFDM, DFT-s-OFDM, or combinations thereof, other waveforms may be used for one or both of the SSB and CORESET transmissions such as, for example, CP-OFDM, SC-FDMA, SC-QAM, etc.

In some cases, one or more of a frequency allocation (if DFT-s-OFDM or OFDM), bandwidth, time duration, or any combinations thereof, of the CORESETs 330 and 370 may be specified or indicated in the MIB of the associated SSBs 325 and 365. In some cases, a DFT-s-OFDM waveform may be used to transmit both the SSBs 325 and 365, and the CORESETs 330 and 370, and contiguous frequency domain allocations may be provided that may provide for an enhanced peak to average power ratio (PAPR) of the associated SSCBs 305 and 345. In some cases, SSBs and CORESETs may be multiplexed in non-contiguous resource in the frequency domain. In cases that use contiguous frequency domain allocations, the MIB may not need to contain an indication of an offset for the associated CORESET. In some cases, a receiving device (e.g., a UE or a base station) may demodulate and decode the multiplexed blocks using one or more reference signals that are provided with the multiplexed blocks, examples of which are discussed with reference to FIGS. 4 and 5.

Figure 4:
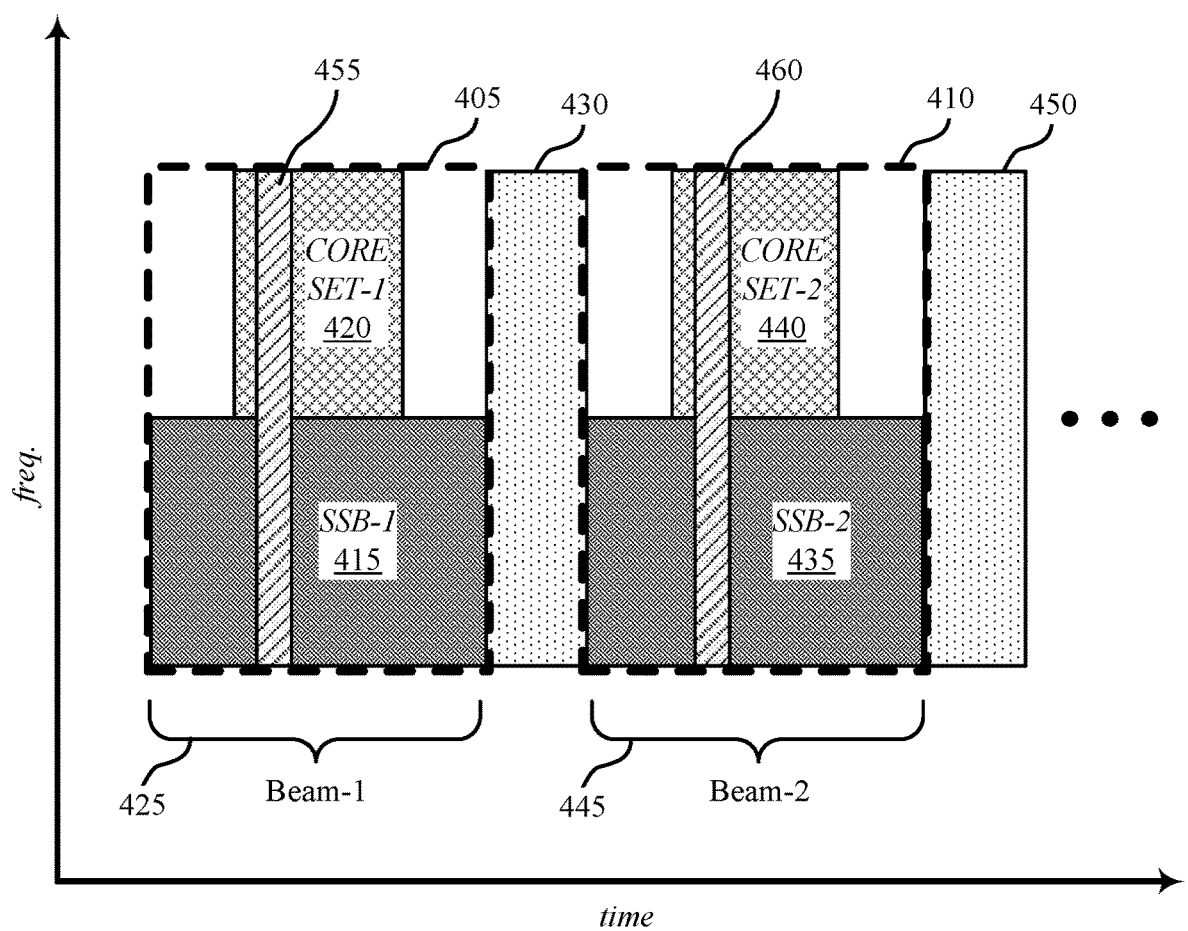

FIG. 4 illustrates an example of wireless resources 400 for multiplexed blocks that support SSB and CORESET multiplexing in wireless communications in accordance with aspects of the present disclosure. In some examples, wireless resources 400 may be used in aspects of wireless communications system 100 or 200. In this example, a first SSCB 405 and a second SSCB 410 may be transmitted in corresponding sets of symbols similarly as discussed with reference to FIG. 3.

The first SSCB 405 may include a first SSB 415 and a first CORESET 420, which may be frequency division multiplexed in a first set of symbols and transmitted using a first beam 425. A first switching gap 430 may be provided between the first SSCB 405 and the second SSCB 410, and a second switching gap 450 may be provided between the second SSCB 410 and a subsequent SSCB if present. As discussed herein, a duration of the first switching gap 430 and second switching gap 450 may provide RF components sufficient time to switch between different beams. The second SSCB 410 may include a second SSB 435 and a second CORESET 440, which may be frequency division multiplexed in the second set of symbols and transmitted using second beam 445.

In the example of FIG. 4, the first SSCB 405 may include a first common reference signal 455 that spans frequency resources of both the first SSB 415 and the first CORESET 420. Likewise, the second SSCB 410 may include a second common reference signal 460 that spans frequency resources of both the second SSB 435 and the second CORESET 440. The common reference signals 455 and 460 may be used for channel estimation for the associated CORESETs 420 and 440 (e.g., demodulation reference signals (DMRSs)), as well as for channel estimation for the PBCH in the corresponding SSBs 415 and 435 (e.g., DMRS for PBCH). In some cases, a number of symbols in the first SSB 415 that contain the first common reference signal 455 may be zero, one, or more, and the corresponding number of symbols in the first CORESET 420 may be zero, one, or more. Similarly, a number of symbols in the second SSB 435 that contain the second common reference signal 460 may be zero, one, or more, and the corresponding number of symbols in the second CORESET 440 may be zero, one, or more.

In cases that use the first common reference signal 455, channel estimation may be needed in order to decode the first SSB 415 to get a bandwidth of the associated first CORESET 420 (e.g., channel estimation may be needed to decode the PBCH that provides an indication of the first CORESET 420 bandwidth). In some cases, the bandwidth of the first CORESET 420 may be determined by the receiving device (e.g., a UE) and this bandwidth may be used to measure the first common reference signal 455. Such techniques may also be used for the second common reference signal 460 in the second SSCB 410. In some cases, the bandwidth of the first CORESET 420 may a fixed bandwidth (e.g., a bandwidth that is specified for a wireless communications network). In some cases, the bandwidth of the first CORESET 420 may be one of multiple available bandwidths (e.g., three available bandwidths), and the receiving device may blind decode the first common reference signal 455 for each of the multiple available bandwidths and determine the bandwidth of the first CORESET 420 based on which blind decode is successful (e.g., which bandwidth has a high correlation between the received signal and the estimated reference signal symbols). In some cases, the bandwidth of the first CORESET 420 may be indicated by a synchronization signal within the first SSB 415 (e.g., available synchronization signal sequences, scrambling codes, or combinations thereof may be partitioned with different partitions associated with different CORESET bandwidths). In some cases, the receiving device may use only a portion of the first common reference signal 455 that overlaps with the first SSB 415 for channel estimation for PBCH in the first SSB 415, and may determine the bandwidth of the first CORESET 420 and perform channel estimation for the first CORESET 420 based on the portion of the first common reference signal 455 that overlaps the first CORESET 420 (or based on the entire bandwidth of the first common reference signal 455).

In some cases in which a DFT-s-OFDM waveform is used for both the CORESET and SSB, the common reference signals 455-460 may be inserted in frequency resources of a dedicated DFT-s-OFDM symbol within the multiplexed block. Such a technique may consume overhead associated with the DFT-s-OFDM symbol, but may provide for enhanced PAPR and may allow a receiving device to perform frequency domain equalization on the reference signal. In other cases, frequency domain reference signal symbols may be inserted at a sub-carrier mapping stage and before inverse FFT (IFFT), such that the reference signals 455-460 share a same DFT-s-OFDM symbol as data (or OFDM symbol as data). In such cases, frequency domain equalization may be performed and PAPR may be increased and overhead decreased relative to a dedicated symbol for the reference signals 455-460. An example of such a reference signal technique is discussed with reference to FIG. 6. In other cases, time-domain symbols of the reference signals 455-460 may be inserted into serial samples before DFT (sharing the same DFT-s-OFDM symbol as data), which may use less overhead than a dedicated symbol, and time-domain equalization may be used at the receiver. An example of such a reference signal technique is discussed with reference to FIG. 7.

Figure 5:
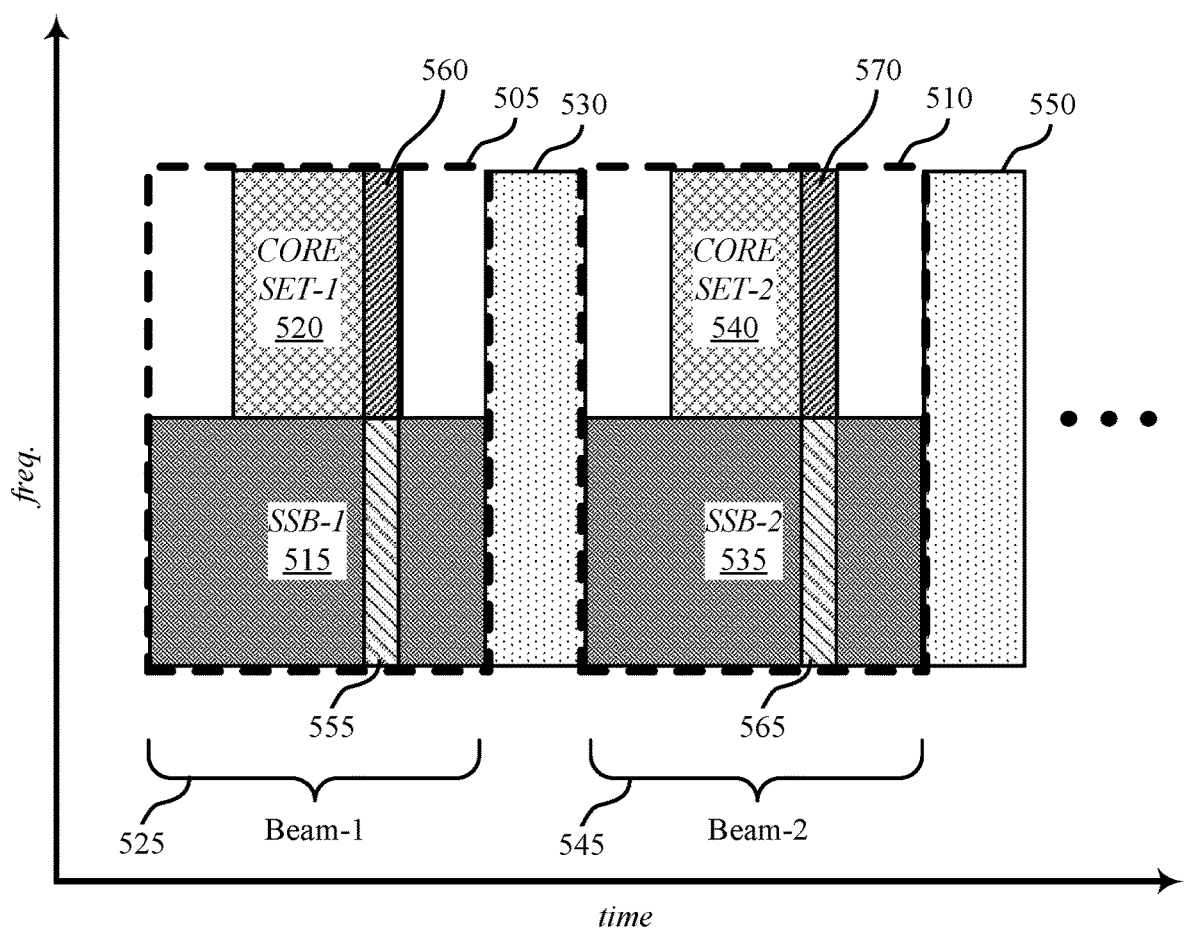

FIG. 5 illustrates an example of wireless resources 500 for multiplexed blocks that use separate reference signals, that support SSB and CORESET multiplexing in wireless communications in accordance with aspects of the present disclosure. In some examples, wireless resources 500 may be used in aspects of wireless communications system 100 or 200. In this example, a first SSCB 505 and a second SSCB 510 may be transmitted in corresponding sets of symbols similarly as discussed with reference to FIG. 3.

The first SSCB 505 may include a first SSB 515 and a first CORESET 520, which may be frequency division multiplexed in a first set of symbols and transmitted using a first beam 525. A first switching gap 530 may be provided between the first SSCB 505 and the second SSCB 510, and a second switching gap 550 may be provided between the second SSCB 510 and a subsequent SSCB if present. As discussed herein, a duration of the first switching gap 530 and second switching gap 550 may provide RF components sufficient time to switch between different beams. The second SSCB 510 may include a second SSB 535 and a second CORESET 540, which may be frequency division multiplexed in the second set of symbols and transmitted using second beam 545.

In the example of FIG. 5, the first SSCB 505 may include a first SSB reference signal 555 that spans frequency resources of the first SSB 515 and may include a first CORESET reference signal 560 that spans frequency resources of the first CORESET 520. Likewise, the second SSCB 510 may include a second SSB reference signal 565 that spans frequency resources of the second SSB 535 and may include a second CORESET reference signal 570 that spans frequency resources of the second CORESET 540. The first SSB reference signal 555 (e.g., a DMRS) may be used for channel estimation for the first SSB 515 and the first CORESET reference signal 560 (e.g., a DMRS) may be used for channel estimation of the first CORESET 520. In some cases, a number of symbols in the first SSB 515 that contain the first SSB reference signal 555 may be zero, one, or more, and a same or different number of symbols in the first CORESET 520 that contain the first CORESET reference signal 560 may be zero, one, or more. Similarly, a number of symbols in the second SSB 535 that contain the second SSB reference signal 565 may be zero, one, or more, and a same or different number of symbols in the second CORESET 540 that contain the second CORESET reference signal 570 may be zero, one, or more. Such separate reference signals may allow a receiving UE to separately perform channel estimation, which may be useful in cases where CORESET0 is not present or not sent.

Figure 6:
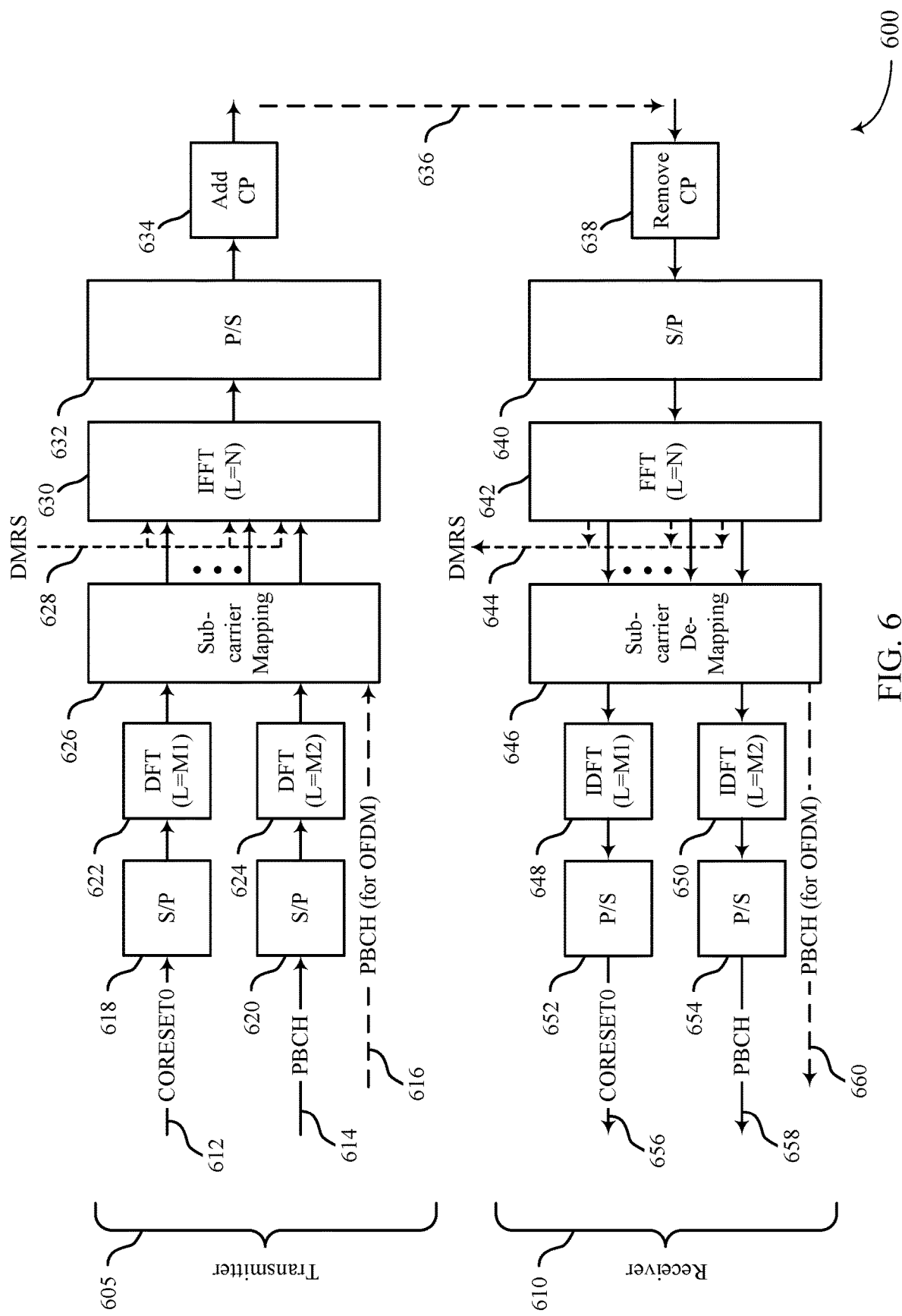
FIGS. 6 and 7 illustrate examples of transmit/receive architectures that support SSB and CORESET multiplexing in wireless communications in accordance with aspects of the present disclosure.

FIG. 6 illustrates an example of an architecture 600 that supports SSB and CORESET multiplexing in wireless communications in accordance with aspects of the present disclosure. In some examples, architecture 600 may implement aspects of wireless communications systems 100 or 200 of FIG. 1 or 2 using multiplexed blocks such as discussed with reference to FIG. 3, 4, or 5. In some aspects, architecture 600 include a transmitter 605 (e.g., a base station 105) and a receiver 610 (e.g., a UE 115), as described herein.

Broadly, FIG. 6 is a diagram illustrating example components of wireless devices in accordance with certain aspects of the disclosure. The illustrated components may include those that may be used for transmission and reception of wireless signals. There are numerous architectures for wireless transmission and reception, and FIG. 6 is provided for purposes of illustration and discussion only. Techniques as discussed herein may be implemented using any suitable architecture. In the example of FIG. 6, the transmitter 605 (e.g., a base station) may generate a CORE-SET0 612 and a PBCH 614 for transmission in a multiplexed block (e.g., for transmission in a SSCB in which a SSB and CORESET are multiplexed in the frequency domain in a set of symbols). In cases where both the CORESET0 612 and PBCH 614 are transmitted using DFT-s-OFDM, the CORE-SET0 612 may be provided to a serial-to-parallel (S/P) component 618 that converts time-domain samples to a parallel output, and the PBCH 614 may be provided to an associated S/P component 620. The output of the S/P component 618 may be provided to a DFT component 622 (having a DFT length of M1), and the output of the S/P component 620 may be provided to associated DFT component 624 (having a DFT length of M2).

The outputs of the DFT components 622-624 may be provided to a sub-carrier mapping component 626. In some cases, the SSB may be transmitted using an OFDM waveform, and the CORESET0 transmitted using a DFT-s-OFDM waveform, and in such cases PBCH 616 of the OFDM SSB is provided directly to the sub-carrier mapping component 626.

As discussed herein, in some cases a common reference signal 628 may be provided that spans frequency resources of the SSB and CORESET. In the example of FIG. 6, the common reference signal 628 may be a DMRS, and frequency domain symbols of the reference signal 628 may be inserted into a subset of the sub-carriers of the sub-carrier mapping, with the reference signal 628 and output of the sub-carrier mapping component 626 provided to an IFFT component 630 for IFFT using a length N. The output of the IFFT component 630 may be provided to a P/S component 632, and then to a CP component 634 where the CP is added. Thus, the CORESET0 612 and PBCH 614 are multiplexed in the frequency domain, along with reference signal 628, and may be provided to RF components for over-the-air transmission 636 to receiver 610.

At the receiver 610, the multiplexed symbol is received at RF components, and a CP component 638 may remove the CP, and provide the resulting symbol to S/P component 640 to convert serial samples to a parallel output. The output of the S/P component 640 may be provided to FFT component 642 for FFT to generate samples associated with each sub-carrier reference signal output 644 may be measured, and the sub-carrier samples provided to sub-carrier de-mapping component 646. The output of the sub-carrier de-mapping component 646 is provided to IDFT component 648 for sub-carriers mapped to the CORESET0 656, and to IDFT component 650 for sub-carriers mapped to the PBCH 658. The output of the IDFT component 648 is provided to a P/S component 652 which outputs CORESET0 656, and the output of the IDFT component 650 is provided to P/S component 654 which outputs PBCH 658. In cases where an OFDM waveform is used for the SSB, PBCH 660 is output from the sub-carrier de-mapping component 646 directly. In cases where the CORESET is transmitted using OFDM rather than DFT-s-OFDM, the CORESET0 612 may be provided directly to the sub-carrier mapping component 626, and the output CORESET0 656 provided directly from the sub-carrier de-mapping component 646.

Figure 7:
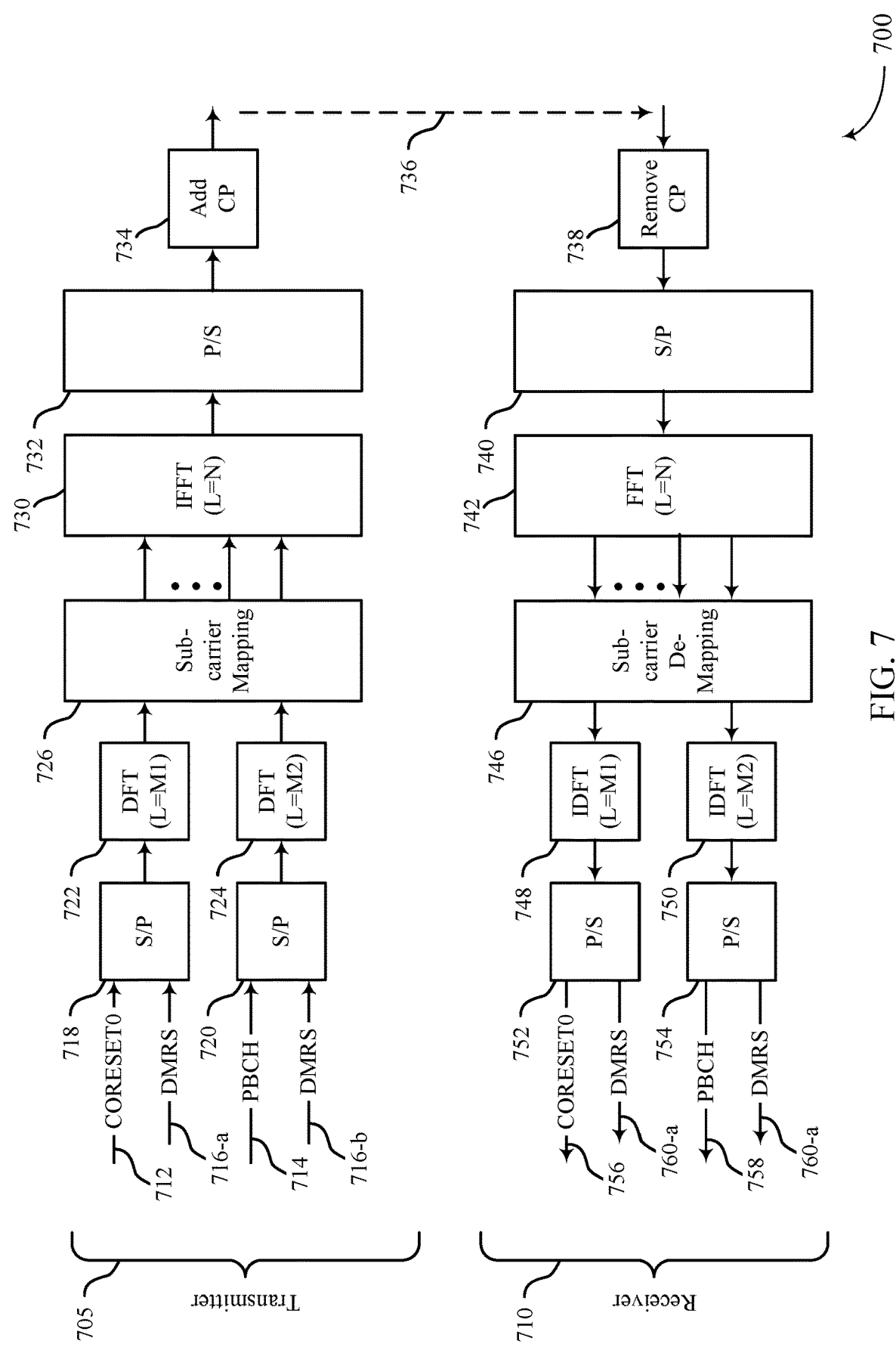

FIG. 7 illustrates an example of an architecture 700 that supports SSB and CORESET multiplexing in wireless communications in accordance with aspects of the present disclosure. In some examples, architecture 700 may implement aspects of wireless communications systems 100 or 200 of FIG. 1 or 2 using multiplexed blocks such as discussed with reference to FIG. 3, 4, or 5. In some aspects, architecture 700 may include a transmitter 705 (e.g., a base station 105) and a receiver 710 (e.g., a UE 115), as described herein.

It is noted that there are numerous architectures for wireless transmission and reception, and FIG. 7 is provided for purposes of illustration and discussion only, with the understanding that techniques as discussed herein may be implemented using any suitable architecture. In the example of FIG. 7, the transmitter 705 (e.g., a base station) may generate a CORESET0 712 and a PBCH 714 for transmission in a multiplexed block (e.g., for transmission in a SSCB in which a SSB and CORESET are multiplexed in the frequency domain in a set of symbols). In this example, a common reference signal 716 (e.g., a DMRS) may be provided as time-domain symbols along with the CORESET0 712 and PBCH 714, and both the CORESET0 712 and PBCH 714 are transmitted using DFT-s-OFDM. The CORESET0 712 and first portion of the common reference signal 716-*a* may be provided to S/P component 718 that converts time-domain samples to a parallel output. The PBCH 714 and second portion of the common reference signal 716-*a* may be provided to an associated S/P component 720. The output of the S/P component 718 may be provided to a DFT component 722 (having a DFT length of M1), and the output of the S/P component 720 may be provided to associated DFT component 724 (having a DFT length of M2). The outputs of the DFT components 722-624 may be provided to a sub-carrier mapping component 726. The output of the sub-carrier mapping component 726 is provided to an IFFT component 730 for IFFT using a length N. The output of the IFFT component 730 may be provided to a P/S component 732, and then to a CP component 734 where the CP is added. Thus, the CORESET0 712 and PBCH 714 are multiplexed in the frequency domain, along with reference signal 716, and may be provided to RF components for over-the-air transmission 736 to receiver 710.

At the receiver 710, the multiplexed symbol is received at RF components, and a CP component 738 may remove the CP, and provide the resulting symbol to S/P component 740 to convert serial samples to a parallel output. The output of the S/P component 740 may be provided to FFT component 742 for FFT to generate samples associated with each sub-carrier. The sub-carrier samples may be provided to sub-carrier de-mapping component 746. The output of the sub-carrier de-mapping component 746 is provided to IDFT component 748 for sub-carriers mapped to the CORESET0 756, and to IDFT component 750 for sub-carriers mapped to the PBCH 758. The output of the IDFT component 748 is provided to a P/S component 752 which outputs CORESET0 756 and first portion of the reference signal 760-*a*, and the output of the IDFT component 750 is provided to P/S component 754 which outputs PBCH 758 and second portion of the reference signal 760-*b*. The reference signal 760 in the time domain samples may be measured and used for channel estimation and decoding of the CORESET0 756 and the PBCH 758.

Figure 8:
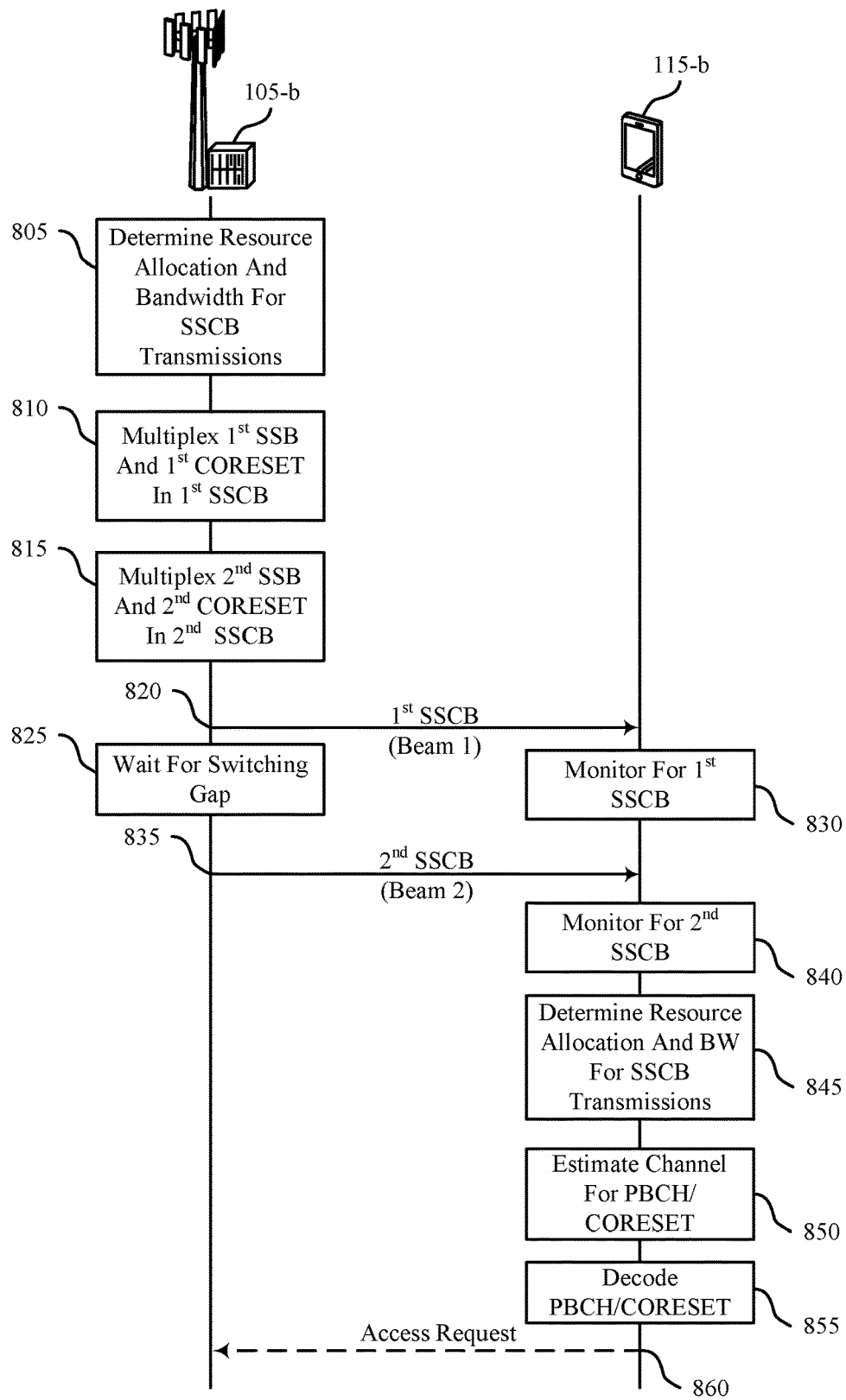
FIG. 8 illustrates an example of a process flow that supports SSB and CORESET multiplexing in wireless communications in accordance with aspects of the present disclosure.

FIG. 8 illustrates an example of a process flow 800 that supports SSB and CORESET multiplexing in wireless communications in accordance with aspects of the present disclosure. Process flow 800 illustrates aspects of techniques performed by a UE 115-*b*, which may be ab example of a UE 115 described with reference to FIGS. 1-2. Process flow 800 also illustrates aspects of techniques performed by a base station 105-*b*, which may be an example of a base station 105 described with reference to FIGS. 1-2. Process flow 800 may implement aspects of wireless communications system 100 or 200. For example, the UE 115-*b* and base station 105-*b* in process flow 800 may support efficient techniques for multiplexing CORESET and SSB transmissions in a set of symbols.

In the following description of the process flow 800, the operations between the UE 115-*b* and the base station 105-*b* may be transmitted in a different order than the example order shown, or the operations performed by the base station 105-*b* and the UE 115-*b* may be performed in different orders or at different times. Some operations may also be omitted from the process flow 800, and other operations may be added to the process flow 800.

At 805, the base station 105-*b* may determine a resource allocation and bandwidth for SSCB transmissions. In some cases, the base station 105-*b* may determine SSB burst parameters such as a number of beams and SSBs to be transmitted, which beams are to carry SSB, associated PBCH parameters for each SSB (e.g., MIB parameters such as an SCS indication, SSB sub-carrier offset, DMRS position, CORESET0 information, and system frame number information). The base station 105-*b* may also determine CORESET0 information that is associated with each beam, such as a frequency domain resource assignment (FDRA) and a time domain resource assignment (TDRA) that identifies resources for a SIB1 PDSCH, a virtual resource block (VRB) to physical resource block (PRB) mapping indication (e.g., indicating interleaved or non-interleaved), a modulation and coding scheme (MCS), a redundancy version (RV) indication, and a system information (SI) indicator. In some cases, the base station 105-*b* may determine that the SCS of communications using the beams exceeds a SCS threshold (e.g., an SCS at or above 960 kHz) and may initiate multiplexing of SSBs and CORESETs into SSCBs. In some cases, the base station 105-*b* may allocate resources for SSCBs based on SSB frequency domain resources and CORESET frequency domain resources, such that the SSCBs may include frequency domain multiplexing of the SSBs and CORESETs.

At 810, the base station 105-*b* may multiplex a first SSB and a first CORESET into a first SSCB. In some cases, the base station 105-*b* may multiplex the first SSB and the first CORESET in contiguous frequency domain resources. In other cases, the base station 105-*b* may multiplex the first SSB and the first CORESET in non-contiguous frequency domain resources. The first SSB and the first CORESET may use a same waveform (e.g., an OFDM waveform or a DFT-s-OFDM waveform), or may use a different waveform (e.g., the first SSB uses an OFDM waveform and the first CORESET uses a DFT-s-OFDM waveform). In some cases, the base station 105-*b* may use a common reference signal in the SSCB that spans frequency resources of both the first SSB and the second SSB. In some cases, the common reference signal may be provided in a dedicated symbol of the SSCB. In some cases, the common reference signal may be located in a subset of subcarriers within a symbol of the associated SSCB. In some cases, the common reference signal may be inserted in a subset of time domain symbols of a set of time domain symbols prior to DFT and IFFT of the set of time domain symbols. At 815, the base station 105-*b* may multiplex a second SSB and a second CORESET into a second SSCB, in a similar manner as the multiplexing of the first SSCB.

At 820, the base station 105-*b* may transmit the first SSCB, which may be received at the UE 115-*b* (and one or more other UEs). In some cases, the first SSCB is transmitted using a first beam, and the SSB and CORESET of the first SSCB are associated with the first beam. As discussed herein, the SSB in the first SSCB may include a PSS and a SSS, and a PBCH that may provide MIB information associated with the first beam. Further, the first CORESET in the first SSCB may provide an indication of PDSCH resources that provide system information.

At 825, the base station 105-*b* may wait for a switching gap to elapse. In some cases, the switching gap may be provided to allow for RF components of the base station 105-*b*, RF components of the UE 115-*b*, or both, to switch from the first beam to a second beam. In some cases, the RF components may have an associated switching time, and the switching gap may be selected to provide sufficient time to allow for the switching time. In some cases, the switching gap along with a CP duration may provide the switching time for the RF components. In some cases, the switching gap may be inserted between SSCBs in the event that a SCS exceeds a threshold value. In some cases, a duration of the switching gap is determined based on the SCS.

At 830, the UE 115-*b* may monitor for the first SSCB. In some cases, the UE 115-*b* may monitor for the PSS and SSS of the SSB, and determine PBCH resources of the first SSB based on the location of the PSS and SSS. In cases where the reference signal of the PBCH is a common reference signal that spans SSB frequency resources and CORESET resources, the UE, in some cases, may identify resources of the common reference signal. In some cases, the UE 115-*b* may identify the dedicated symbol of the SSCB, the subset of subcarriers within a symbol of the associated SSCB, or the subset of time domain symbols, that include the common reference signal.

At 835, the base station 105-*b* may transmit the second SSCB, which may be received at the UE 115-*b* (and one or more other UEs) subsequent to the switching gap. In some cases, the second SSCB is transmitted using a second beam, and the SSB and CORESET of the second SSCB are associated with the second beam. At 840, the UE may monitor for the second SSCB in a similar manner as the monitoring for the first SSB. The UE may successfully decode the SSB of at least one of the first SSCB or second SSCB.

At 845, the UE 115-*b* may determine resource allocations and bandwidth for the SSCB transmissions. In some cases, the UE 115-*b* may determine a CORESET bandwidth based on a pre-specified CORESET bandwidth. In some cases, the UE may determine the CORESET bandwidth by blind decoding the common reference signal according to a set of available CORESET bandwidths to identify which bandwidth of the set of available bandwidths is used for the CORESET transmission. In some cases, the UE 115-*b* may identify the CORESET bandwidth based on a synchronization signal in the SSB (e.g., based on a CORESET bandwidth that is associated with a set of synchronization signal sequences). In some cases, the UE 115-*b* may identify the CORESET bandwidth based on an indication in the SSB, which may be decoded using a portion of the common reference signal that overlaps with the SSB.

At 850, the UE 115-*b* may estimate a channel associated with each SSB (e.g., PBCH) and the CORESET. In some cases, a reference signal transmitted with the SSCBs may be used to estimate a channel for both the SSB and CORESET. In cases where a common reference signal is provided in a dedicated symbol of the SSCB, the channel estimate may be based on a frequency domain equalized reference signal from the dedicated symbol. In cases where the common reference signal is located in a subset of subcarriers within a symbol of the associated SSCB, the channel estimate may be based on the mapped sub-carriers that carry the reference signal. In cases where the common reference signal is inserted in a subset of time domain symbols prior to DFT and IFFT of the set of time domain symbols, the UE 115-*b* may extract the common reference signal after FFT and IDFT, and perform channel estimation using the common reference signal. In some cases, different reference signals are transmitted for the SSB and CORESET within an SSCB, and in such cases the UE 115-*b* estimates the channel for PBCH and CORESET separately.

At 855, the UE 115-*b* may decode the PBCH and CORESET. In some cases, the decoding may be based on the common reference signal that spans frequency resources of both the PBCH and the CORESET. In some cases, the UE 115-*b* may decode the PBCH to identify MIB information, and may decode the CORESET to obtain PDSCH resources that provide one or more SIBs. Optionally, at 860, the UE 115-*b* may transmit an access request (e.g., a random access channel (RACH) request message seeking to initiate a connection establishment). In some cases, the resources for the RACH request message may be selected based on which received SSB has the best, or acceptable, channel conditions.

Figure 9:
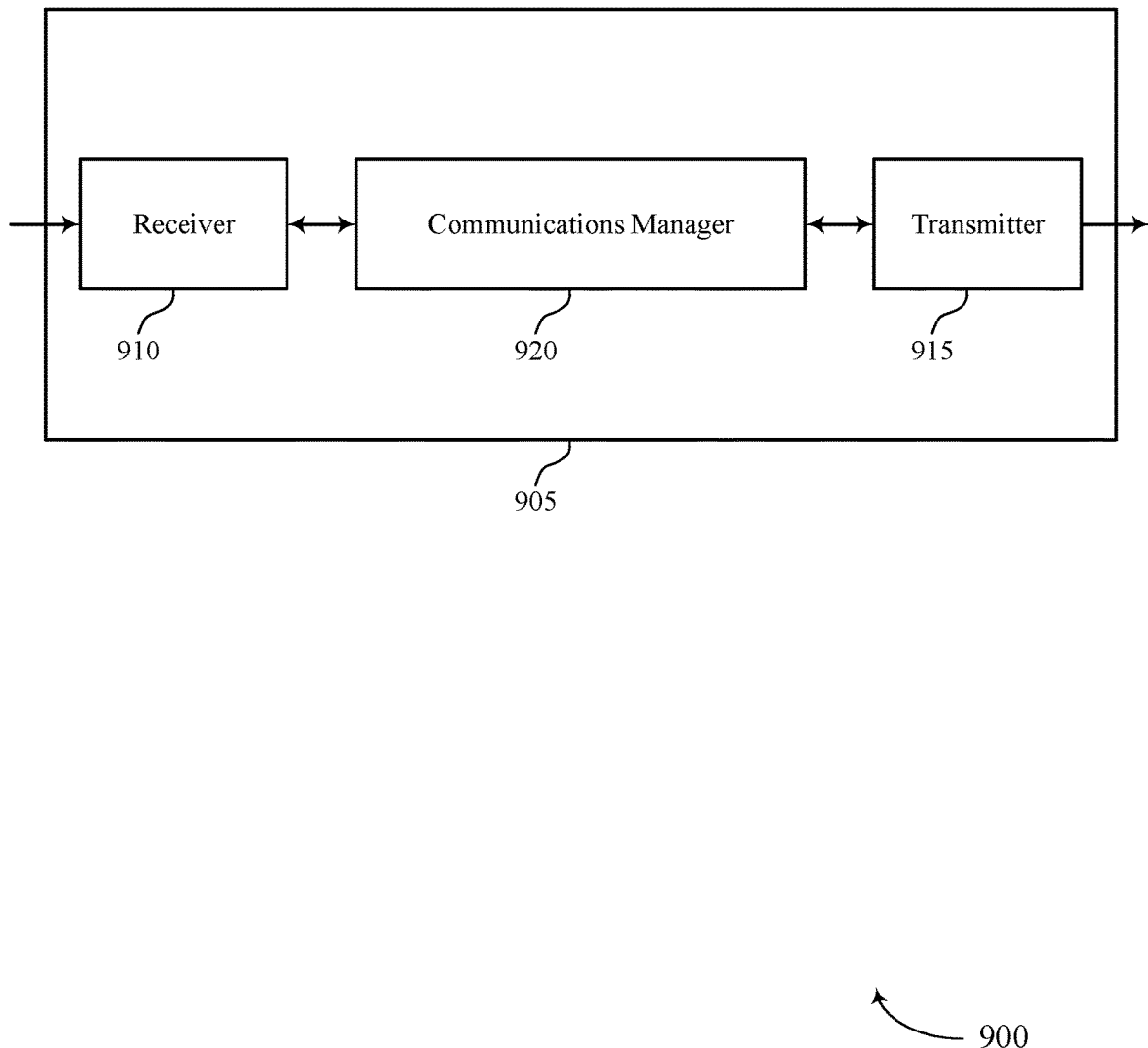
FIGS. 9 and 10 show block diagrams of devices that support SSB and CORESET multiplexing in wireless communications in accordance with aspects of the present disclosure.

FIG. 9 shows a block diagram 900 of a device 905 that supports SSB and CORESET multiplexing in wireless communications in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to SSB and CORESET multiplexing in wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to SSB and CORESET multiplexing in wireless communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of SSB and CORESET multiplexing in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for monitoring a first beam for a first multiplexed block that includes a first SSB that is multiplexed in a frequency domain with a first CORESET, the first multiplexed block including a first set of symbols that each have an associated cyclic prefix. The communications manager 920 may be configured as or otherwise support a means for monitoring a second beam, subsequent to a switching gap following the first multiplexed block, for a second multiplexed block that includes a second SSB that is multiplexed in the frequency domain with a second CORESET, the second multiplexed block including a second set of symbols that each have an associated cyclic prefix, where an initial cyclic prefix of an initial symbol of the second multiplexed block starts after the switching gap. The communications manager 920 may be configured as or otherwise support a means for decoding one or more of the first multiplexed block or the second multiplexed block.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for multiplexing, in the frequency domain, SSBs and CORESETs into a multiplexed block. In particular, the techniques described herein may allow a single switching gap between consecutive multiplexed blocks. As a result, multiple switching gaps between SSB transmissions and CORESET transmissions can be reduced to thereby reduce overhead in systems that use switching gaps for beam switching procedures and thereby enhance system efficiency. Further, described techniques may provide for flexibility in selection of different waveforms within a multiplexed block for SSB and CORESET transmissions.

Additionally, or alternatively, described techniques may provide for enhanced channel estimation using a common reference signal that spans both the SSB and CORESET.

Figure 10:
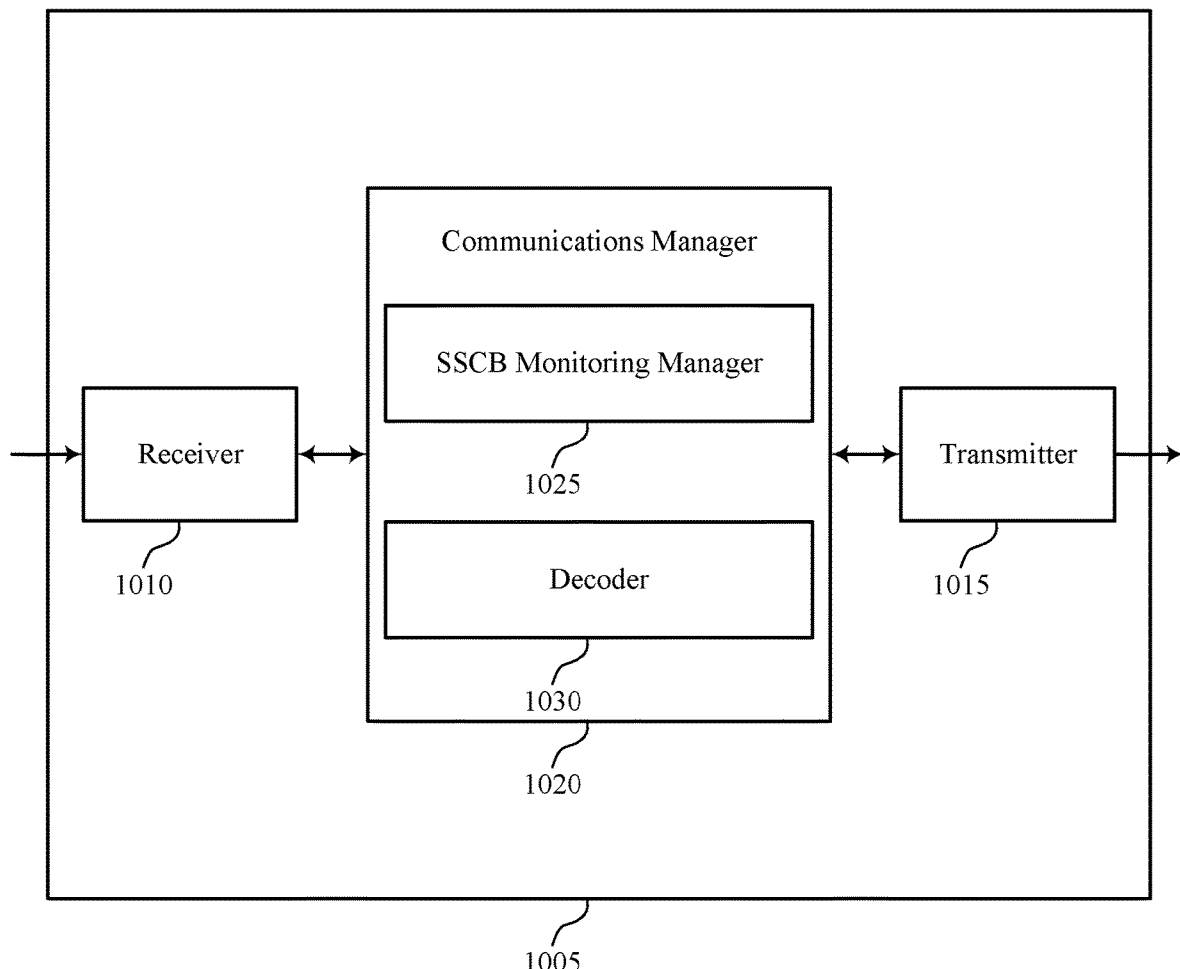

FIG. 10 shows a block diagram 1000 of a device 1005 that supports SSB and CORESET multiplexing in wireless communications in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to SSB and CORESET multiplexing in wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to SSB and CORESET multiplexing in wireless communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of SSB and CORESET multiplexing in wireless communications as described herein. For example, the communications manager 1020 may include an SSCB monitoring manager 1025 a decoder 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The SSCB monitoring manager 1025 may be configured as or otherwise support a means for monitoring a first beam for a first multiplexed block that includes a first SSB that is multiplexed in a frequency domain with a first CORESET, the first multiplexed block including a first set of symbols that each have an associated cyclic prefix. The SSCB monitoring manager 1025 may be configured as or otherwise support a means for monitoring a second beam, subsequent to a switching gap following the first multiplexed block, for a second multiplexed block that includes a second SSB that is multiplexed in the frequency domain with a second CORESET, the second multiplexed block including a second set of symbols that each have an associated cyclic prefix, where an initial cyclic prefix of an initial symbol of the second multiplexed block starts after the switching gap. The decoder 1030 may be configured as or otherwise support a means for decoding one or more of the first multiplexed block or the second multiplexed block.

Figure 11:
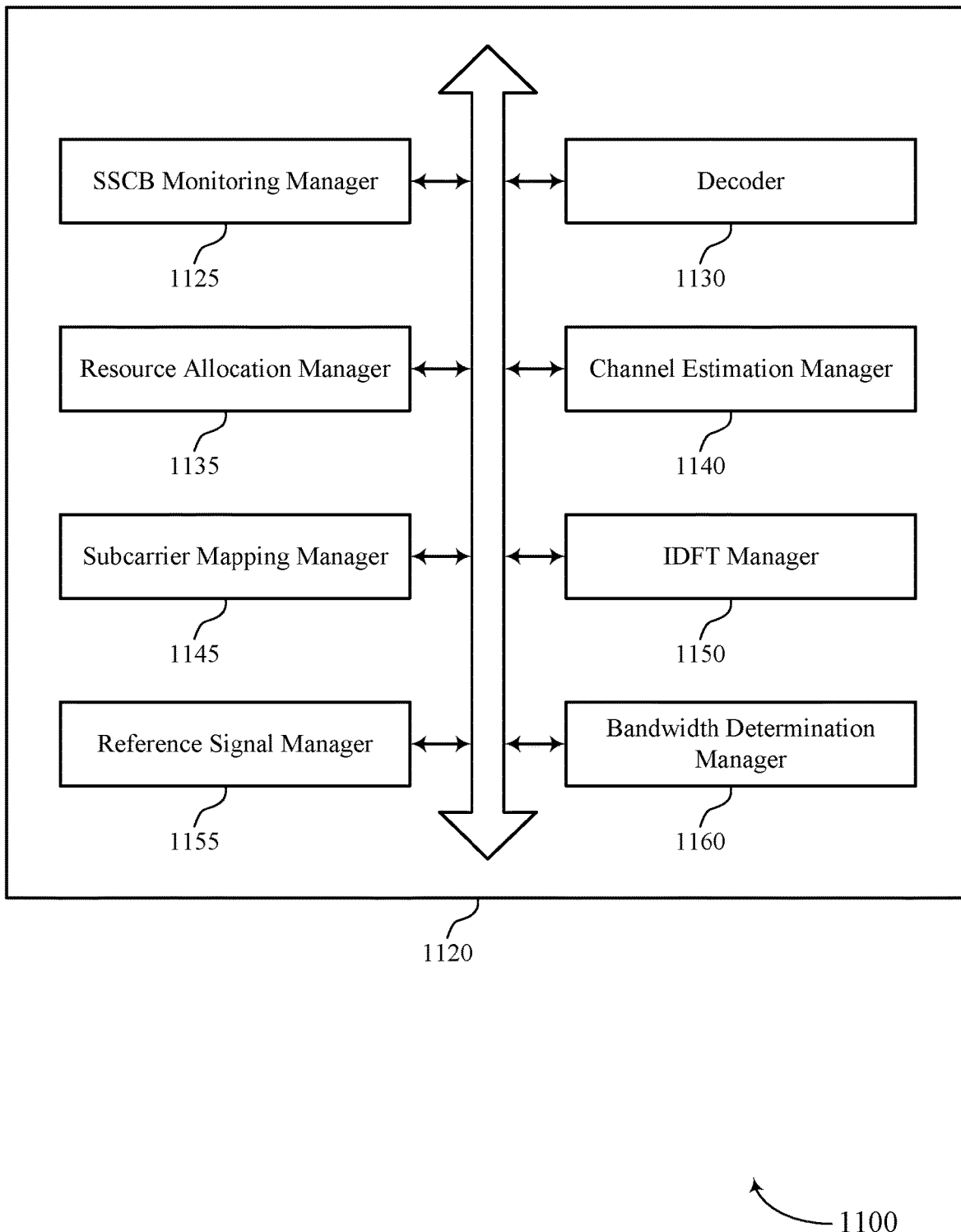
FIG. 11 shows a block diagram of a communications manager that supports SSB and CORESET multiplexing in wireless communications in accordance with aspects of the present disclosure.

FIG. 11 shows a block diagram 1100 of a communications manager 1120 that supports SSB and CORESET multiplexing in wireless communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of SSB and CORESET multiplexing in wireless communications as described herein. For example, the communications manager 1120 may include an SSCB monitoring manager 1125, a decoder 1130, a resource allocation manager 1135, a channel estimation manager 1140, a subcarrier mapping manager 1145, an IDFT manager 1150, a reference signal manager 1155, a bandwidth determination manager 1160, or any combination thereof. Each of these components may communicate, directly or indirectly, with one another (e.g., via one or more buses).

The communications manager 1120 may support wireless communication at a UE in accordance with examples as disclosed herein. The SSCB monitoring manager 1125 may be configured as or otherwise support a means for monitoring a first beam for a first multiplexed block that includes a first SSB that is multiplexed in a frequency domain with a first CORESET, the first multiplexed block including a first set of symbols that each have an associated cyclic prefix. In some examples, the SSCB monitoring manager 1125 may be configured as or otherwise support a means for monitoring a second beam, subsequent to a switching gap following the first multiplexed block, for a second multiplexed block that includes a second SSB that is multiplexed in the frequency domain with a second CORESET, the second multiplexed block including a second set of symbols that each have an associated cyclic prefix, where an initial cyclic prefix of an initial symbol of the second multiplexed block starts after the switching gap. The decoder 1130 may be configured as or otherwise support a means for decoding one or more of the first multiplexed block or the second multiplexed block.

In some examples, the first SSB is transmitted using a first waveform, and the first CORESET is transmitted using a second waveform that is a different waveform than the first waveform. In some examples, the first waveform is an orthogonal frequency division multiplexing (OFDM) waveform or a discrete Fourier transform spread OFDM (DFT-s-OFDM) waveform, and the second waveform is an OFDM waveform or a DFT-s-OFDM waveform.

In some examples, the resource allocation manager 1135 may be configured as or otherwise support a means for determining one or more of a frequency allocation, a bandwidth, or a time duration of the first CORESET based on one or more predetermined values or an indication provided in an information block within the first SSB. In some examples, each of the first SSB and the first CORESET, and each of the second SSB and the second CORESET, are multiplexed in a continuous frequency domain allocation.

In some examples, the channel estimation manager 1140 may be configured as or otherwise support a means for estimating a channel associated with the first SSB and the first CORESET based on a first reference signal contained in the first multiplexed block, where the first reference signal spans frequency resources associated with the first SSB and the first CORESET. In some examples, the first reference signal spans a fixed frequency bandwidth associated with the first multiplexed block.

In some examples, the reference signal manager 1155 may be configured as or otherwise support a means for blind decoding two or more frequency bandwidth candidates within the first multiplexed block to identify a frequency bandwidth of the first reference signal. In some examples, the reference signal manager 1155 may be configured as or otherwise support a means for identifying a frequency bandwidth that contains the first reference signal based on an indication provided by a synchronization signal within the first SSB.

In some examples, to support estimating, the channel estimation manager 1140 may be configured as or otherwise support a means for estimating the channel associated with the first SSB based on a first portion of the first reference signal that spans a first frequency bandwidth associated with the first SSB. In some examples, to support estimating, the bandwidth determination manager 1160 may be configured as or otherwise support a means for determining, based at least in part information from the first SSB, a second frequency bandwidth associated with the first CORESET. In some examples, to support estimating, the channel estimation manager 1140 may be configured as or otherwise support a means for estimating the channel associated with the first CORESET based on a second portion of the first reference signal that spans the second frequency bandwidth.

In some examples, the channel estimation manager 1140 may be configured as or otherwise support a means for estimating a first channel associated with the first SSB based on a first reference signal in a first frequency bandwidth associated with the first SSB. In some examples, the channel estimation manager 1140 may be configured as or otherwise support a means for estimating a second channel associated with the first CORESET based on a second reference signal in a second frequency bandwidth associated with the first CORESET. In some examples, the channel estimation manager 1140 may be configured as or otherwise support a means for estimating a channel associated with each multiplexed block based on a reference signal in a dedicated DFT-s-ODFM symbol within the associated multiplexed block.

In some examples, the subcarrier mapping manager 1145 may be configured as or otherwise support a means for estimating a channel associated with each multiplexed block based on a reference signal that is located in a subset of subcarriers within a symbol of the associated multiplexed block.

In some examples, the IDFT manager 1150 may be configured as or otherwise support a means for estimating a channel associated with each multiplexed block based on a reference signal that is located in a subset of time domain symbols of a set of time domain symbols that are generated after a fast Fourier transform (FFT) and inverse discrete Fourier transform of one or more received symbols of the associated multiplexed block.

Figure 12:
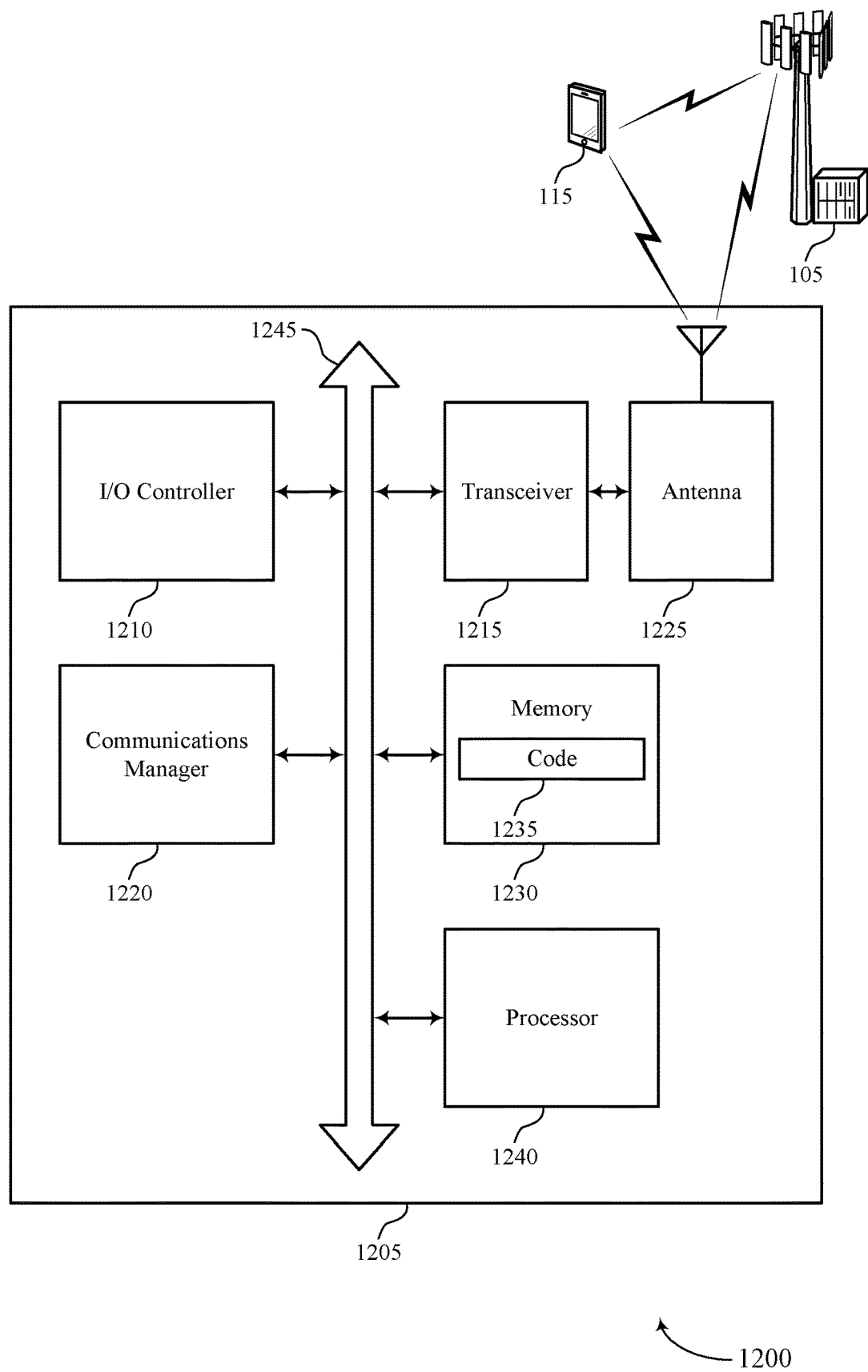
FIG. 12 shows a diagram of a system including a device that supports SSB and CORESET multiplexing in wireless communications in accordance with aspects of the present disclosure.

FIG. 12 shows a diagram of a system 1200 including a device 1205 that supports SSB and CORESET multiplexing in wireless communications in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting SSB and CORESET multiplexing in wireless communications). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for monitoring a first beam for a first multiplexed block that includes a first SSB that is multiplexed in a frequency domain with a first CORESET, the first multiplexed block including a first set of symbols that each have an associated cyclic prefix. The communications manager 1220 may be configured as or otherwise support a means for monitoring a second beam, subsequent to a switching gap following the first multiplexed block, for a second multiplexed block that includes a second SSB that is multiplexed in the frequency domain with a second CORESET, the second multiplexed block including a second set of symbols that each have an associated cyclic prefix, where an initial cyclic prefix of an initial symbol of the second multiplexed block starts after the switching gap. The communications manager 1220 may be configured as or otherwise support a means for decoding one or more of the first multiplexed block or the second multiplexed block.

By including or configuring the communications manager 1220 in accordance with examples as described herein, the device 1205 may support techniques for multiplexing, in the frequency domain, SSBs and CORESETs into a multiplexed block. In particular, the techniques described herein may allow a single switching gap between consecutive multiplexed blocks that may reduce overhead in systems that use switching gaps for beam switching procedures between consecutive SSBs and CORESETs, and thereby enhance system efficiency. Further, described techniques may provide for flexibility in selection of different waveforms within a multiplexed block for SSB and CORESET transmissions. Additionally, or alternatively, described techniques may provide for enhanced channel estimation using a common reference signal that spans both the SSB and CORESET.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of SSB and CORESET multiplexing in wireless communications as described herein, or the processor 1240 and the memory 1230 may be otherwise configured to perform or support such operations.

Figure 13:
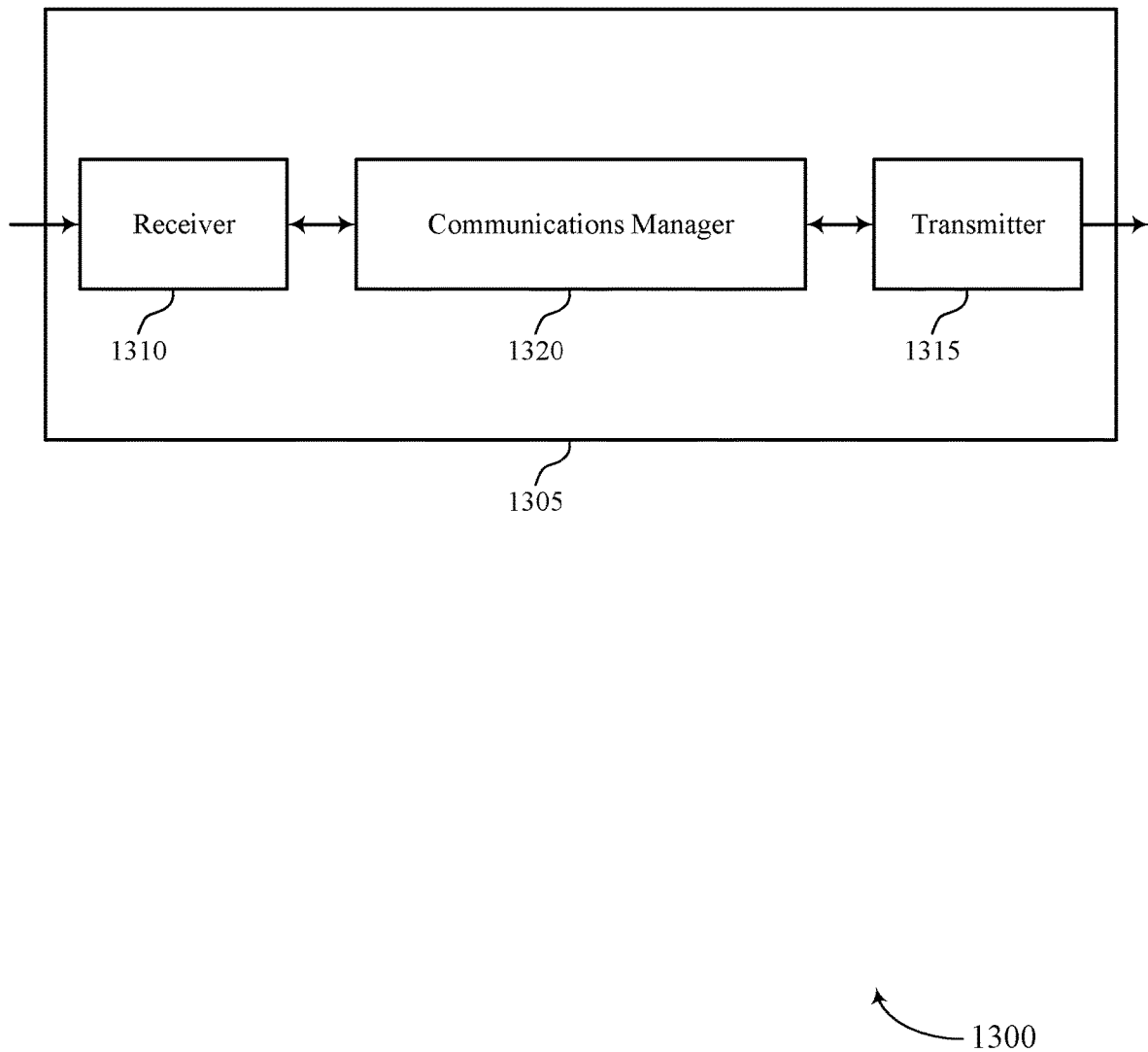
FIGS. 13 and 14 show block diagrams of devices that support SSB and CORESET multiplexing in wireless communications in accordance with aspects of the present disclosure.

FIG. 13 shows a block diagram 1300 of a device 1305 that supports SSB and CORESET multiplexing in wireless communications in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to SSB and CORESET multiplexing in wireless communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to SSB and CORESET multiplexing in wireless communications). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of SSB and CORESET multiplexing in wireless communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for multiplexing, in a frequency domain for a first beam, a first SSB and a first CORESET into a first multiplexed block that includes a first set of symbols that each have an associated cyclic prefix. The communications manager 1320 may be configured as or otherwise support a means for multiplexing, in the frequency domain for a second beam, a second SSB and a second CORESET into a second multiplexed block that includes a second set of symbols that each have an associated cyclic prefix. The communications manager 1320 may be configured as or otherwise support a means for transmitting the first multiplexed block in the first set of symbols. The communications manager 1320 may be configured as or otherwise support a means for transmitting, subsequent to a switching gap following the first set of symbols, the second multiplexed block in the second set of symbols, where an initial cyclic prefix of an initial symbol of the second multiplexed block starts after the switching gap.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for multiplexing, in the frequency domain, SSBs and CORESETs into a multiplexed block. In particular, the techniques described herein may allow a single switching gap between consecutive multiplexed blocks providing more efficient utilization of communication resources relative to cases where multiple switching gaps may be present between SSB transmissions and CORESET transmissions. Further, described techniques may provide for flexibility in selection of different waveforms within a multiplexed block for SSB and CORESET transmissions. Additionally, or alternatively, described techniques may provide for enhanced channel estimation using a common reference signal that spans both the SSB and CORESET.

Figure 14:
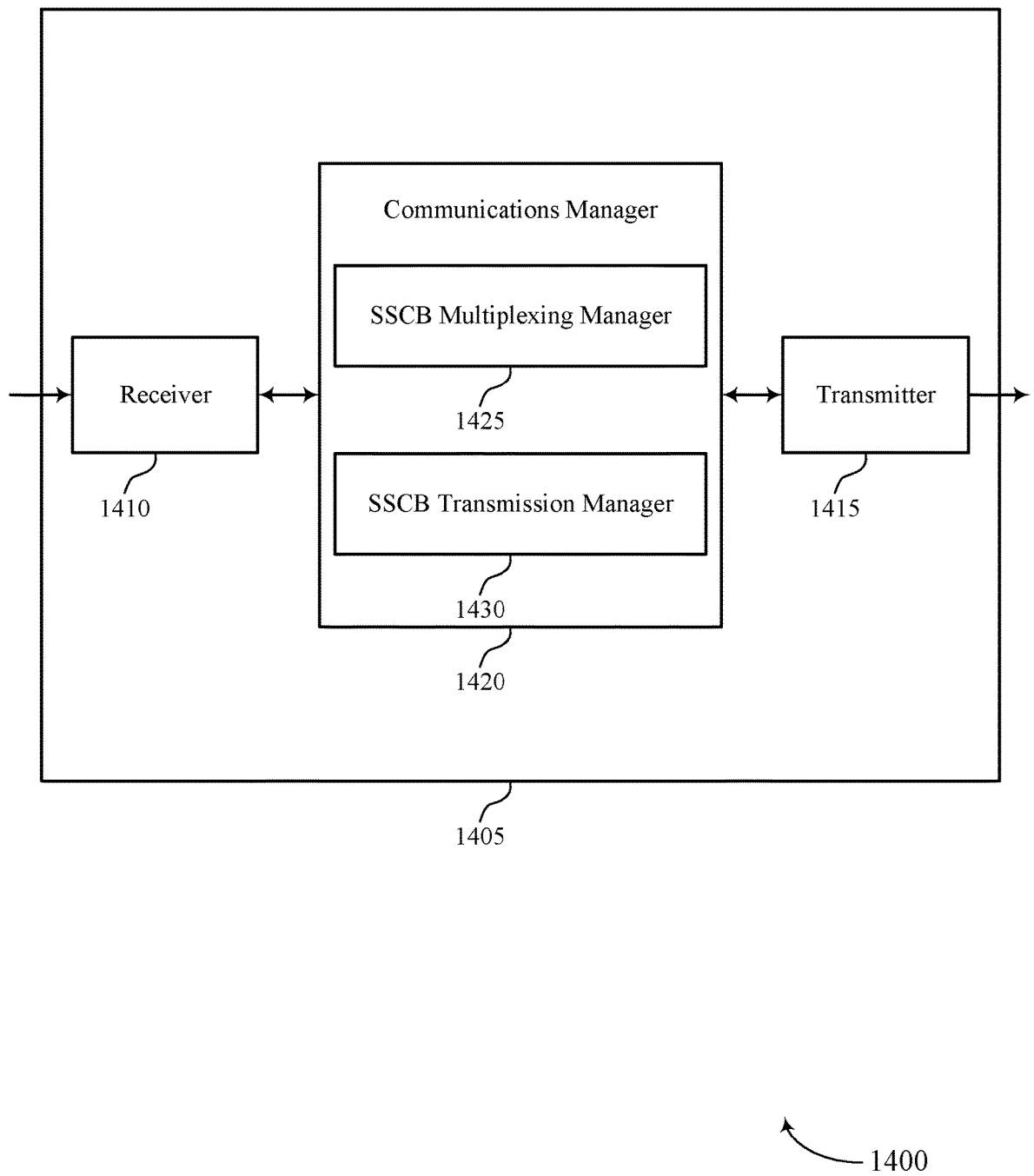

FIG. 14 shows a block diagram 1400 of a device 1405 that supports SSB and CORESET multiplexing in wireless communications in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to SSB and CORESET multiplexing in wireless communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to SSB and CORESET multiplexing in wireless communications). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of SSB and CORESET multiplexing in wireless communications as described herein. For example, the communications manager 1420 may include an SSCB multiplexing manager 1425 an SSCB transmission manager 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The SSCB multiplexing manager 1425 may be configured as or otherwise support a means for multiplexing, in a frequency domain for a first beam, a first SSB and a first CORESET into a first multiplexed block that includes a first set of symbols that each have an associated cyclic prefix. The SSCB multiplexing manager 1425 may be configured as or otherwise support a means for multiplexing, in the frequency domain for a second beam, a second SSB and a second CORESET into a second multiplexed block that includes a second set of symbols that each have an associated cyclic prefix. The SSCB transmission manager 1430 may be configured as or otherwise support a means for transmitting the first multiplexed block in the first set of symbols. The SSCB transmission manager 1430 may be configured as or otherwise support a means for transmitting, subsequent to a switching gap following the first set of symbols, the second multiplexed block in the second set of symbols, where an initial cyclic prefix of an initial symbol of the second multiplexed block starts after the switching gap.

Figure 15:
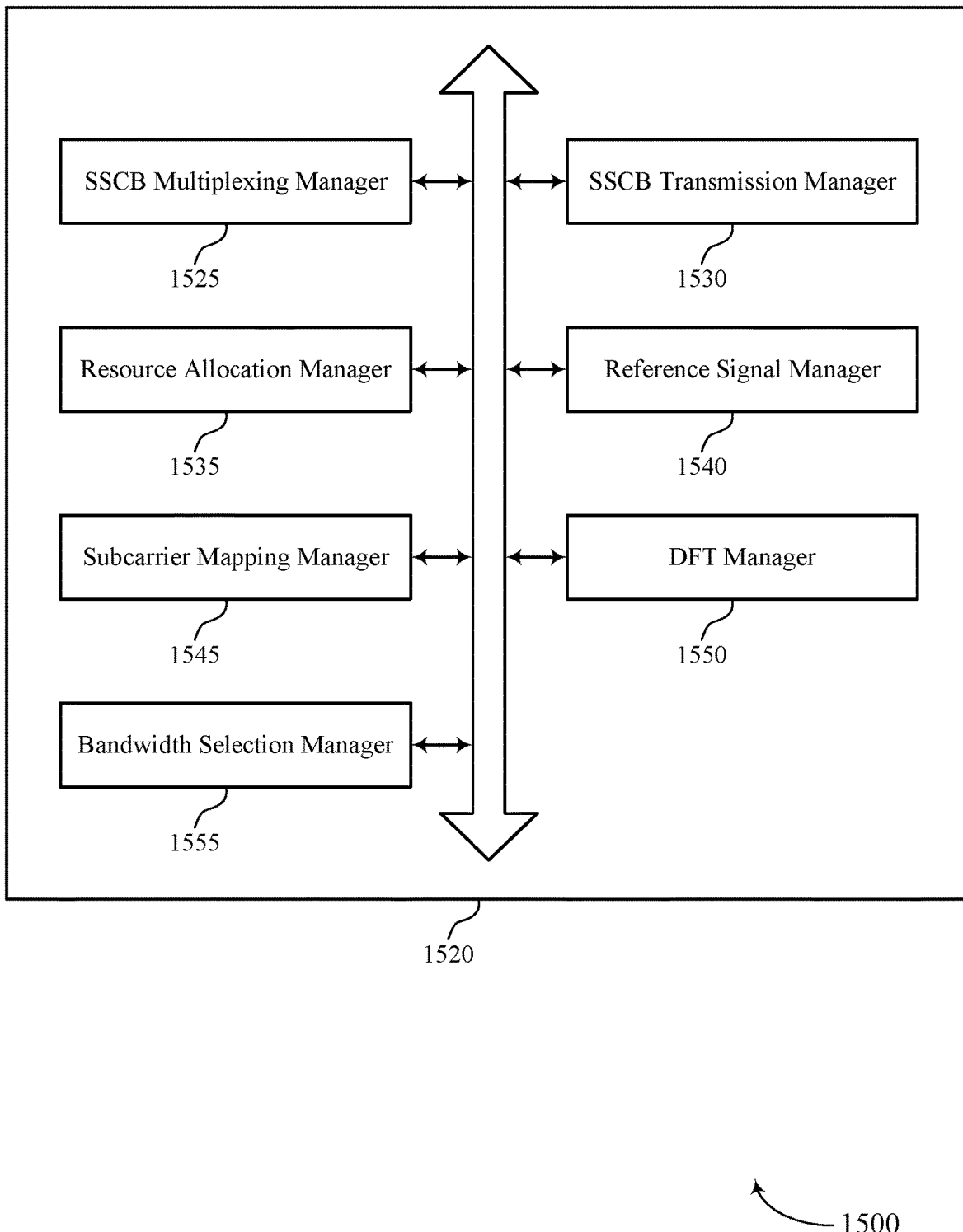
FIG. 15 shows a block diagram of a communications manager that supports SSB and CORESET multiplexing in wireless communications in accordance with aspects of the present disclosure.

FIG. 15 shows a block diagram 1500 of a communications manager 1520 that supports SSB and CORESET multiplexing in wireless communications in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of SSB and CORESET multiplexing in wireless communications as described herein. For example, the communications manager 1520 may include an SSCB multiplexing manager 1525, an SSCB transmission manager 1530, a resource allocation manager 1535, a reference signal manager 1540, a subcarrier mapping manager 1545, a DFT manager 1550, a bandwidth selection manager 1555, or any combination thereof. Each of these components may communicate, directly or indirectly, with one another (e.g., via one or more buses).

The communications manager 1520 may support wireless communication at a base station in accordance with examples as disclosed herein. The SSCB multiplexing manager 1525 may be configured as or otherwise support a means for multiplexing, in a frequency domain for a first beam, a first SSB and a first CORESET into a first multiplexed block that includes a first set of symbols that each have an associated cyclic prefix. In some examples, the SSCB multiplexing manager 1525 may be configured as or otherwise support a means for multiplexing, in the frequency domain for a second beam, a second SSB and a second CORESET into a second multiplexed block that includes a second set of symbols that each have an associated cyclic prefix. The SSCB transmission manager 1530 may be configured as or otherwise support a means for transmitting the first multiplexed block in the first set of symbols. In some examples, the SSCB transmission manager 1530 may be configured as or otherwise support a means for transmitting, subsequent to a switching gap following the first set of symbols, the second multiplexed block in the second set of symbols, where an initial cyclic prefix of an initial symbol of the second multiplexed block starts after the switching gap.

In some examples, the first SSB is transmitted using a first waveform, and the first CORESET is transmitted using a second waveform that is a different waveform than the first waveform, and where the first waveform is an orthogonal frequency division multiplexing (OFDM) waveform or a DFT-s-OFDM waveform, and the second waveform is an OFDM waveform or a DFT-s-OFDM waveform.

In some examples, the SSCB multiplexing manager 1525 may be configured as or otherwise support a means for determining one or more of a frequency allocation, a bandwidth, or a time duration of the first CORESET based on one or more predetermined values or an indication provided in an information block within the first SSB, and where the associated SSB and CORESET of each associated multiplexed block are multiplexed in a continuous frequency domain allocation.

In some examples, to support transmitting the first multiplexed block, the resource allocation manager 1535 may be configured as or otherwise support a means for transmitting a first reference signal in the first multiplexed block, where the first reference signal spans frequency resources associated with the first SSB and the first CORESET. In some examples, the first reference signal spans a fixed frequency bandwidth associated with the first multiplexed block.

In some examples, the bandwidth selection manager 1555 may be configured as or otherwise support a means for selecting a frequency bandwidth for the first reference signal from two or more blind decoding frequency bandwidth candidates within the first multiplexed block. In some examples, the bandwidth selection manager 1555 may be configured as or otherwise support a means for selecting a frequency bandwidth for the first reference signal from two or more available frequency bandwidths within the first multiplexed block. In some examples, the bandwidth selection manager 1555 may be configured as or otherwise support a means for transmitting an indication of the frequency bandwidth for the first reference signal in a synchronization signal within the first SSB.

In some examples, to support transmitting the first multiplexed block, the reference signal manager 1540 may be configured as or otherwise support a means for transmitting a first reference signal in a first frequency bandwidth associated with the first SSB. In some examples, to support transmitting the first multiplexed block, the reference signal manager 1540 may be configured as or otherwise support a means for transmitting a second reference signal in a second frequency bandwidth associated with the first CORESET.

In some examples, the reference signal manager 1540 may be configured as or otherwise support a means for transmitting a reference signal in each multiplexed block, where the reference signal is transmitted in. In some examples, the reference signal manager 1540 may be configured as or otherwise support a means for a dedicated DFT-s-ODFM symbol within the associated multiplexed block. In some examples, the subcarrier mapping manager 1545 may be configured as or otherwise support a means for a subset of subcarriers within one or more symbols of the associated multiplexed block. In some examples, the DFT manager 1550 may be configured as or otherwise support a means for a subset of time domain symbols inserted into a set of time domain symbols prior to a discrete Fourier transform of the associated multiplexed block.

Figure 16:
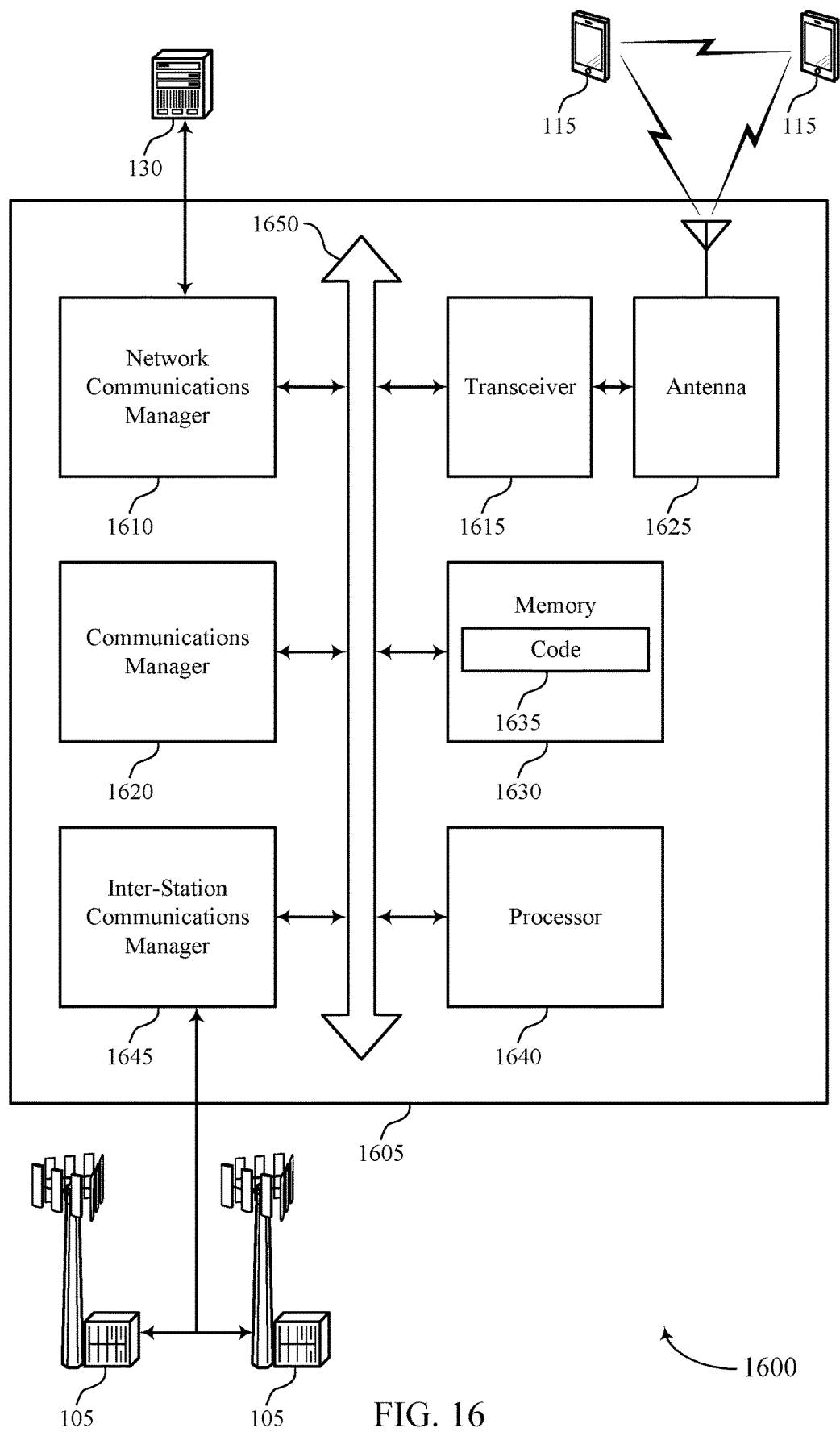
FIG. 16 shows a diagram of a system including a device that supports SSB and CORESET multiplexing in wireless communications in accordance with aspects of the present disclosure.

FIG. 16 shows a diagram of a system 1600 including a device 1605 that supports SSB and CORESET multiplexing in wireless communications in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting SSB and CORESET multiplexing in wireless communications). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for multiplexing, in a frequency domain for a first beam, a first SSB and a first CORESET into a first multiplexed block that includes a first set of symbols that each have an associated cyclic prefix. The communications manager 1620 may be configured as or otherwise support a means for multiplexing, in the frequency domain for a second beam, a second SSB and a second CORESET into a second multiplexed block that includes a second set of symbols that each have an associated cyclic prefix. The communications manager 1620 may be configured as or otherwise support a means for transmitting the first multiplexed block in the first set of symbols. The communications manager 1620 may be configured as or otherwise support a means for transmitting, subsequent to a switching gap following the first set of symbols, the second multiplexed block in the second set of symbols, where an initial cyclic prefix of an initial symbol of the second multiplexed block starts after the switching gap.

By including or configuring the communications manager 1620 in accordance with examples as described herein, the device 1605 may support techniques for multiplexing, in the frequency domain, SSBs and CORESETs into a multiplexed block. In particular, the techniques described herein may allow a single switching gap between consecutive multiplexed blocks. As a result, multiple switching gaps between SSB transmissions and CORESET transmissions can be reduced to thereby reduce overhead in systems that use switching gaps for beam switching procedures and thereby enhance system efficiency. Further, described techniques may provide for flexibility in selection of different waveforms within a multiplexed block for SSB and CORESET transmissions. Additionally, or alternatively, described techniques may provide for enhanced channel estimation using a common reference signal that spans both the SSB and CORESET.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of SSB and CORESET multiplexing in wireless communications as described herein, or the processor 1640 and the memory 1630 may be otherwise configured to perform or support such operations.

Figure 17:
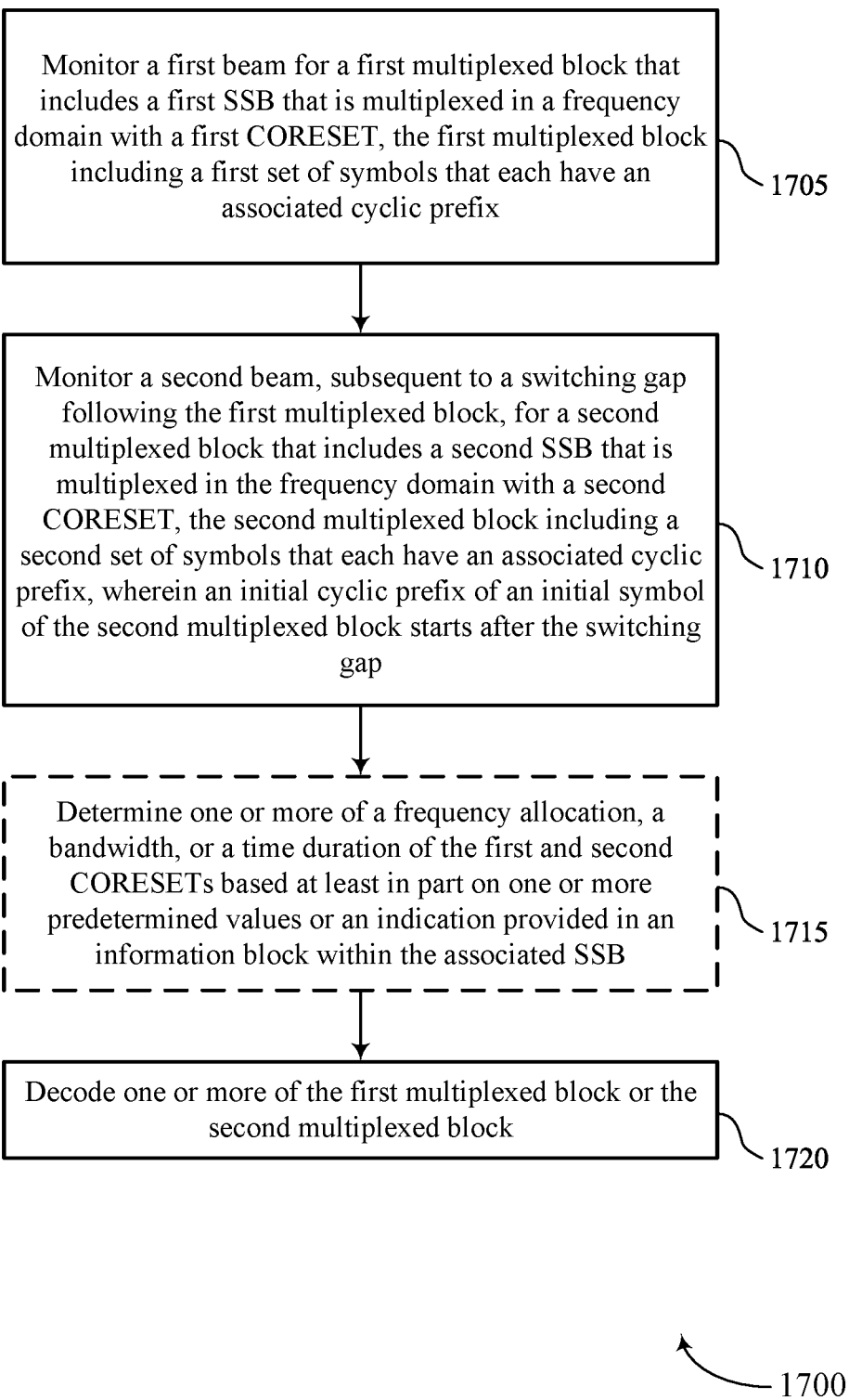
FIGS. 17 through 20 show flowcharts illustrating methods that support SSB and CORESET multiplexing in wireless communications in accordance with aspects of the present disclosure.

FIG. 17 shows a flowchart illustrating a method 1700 that supports SSB and CORESET multiplexing in wireless communications in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include monitoring a first beam for a first multiplexed block that includes a first SSB that is multiplexed in a frequency domain with a first CORESET, the first multiplexed block including a first set of symbols that each have an associated cyclic prefix. The operations of 1705 may be performed in accordance with examples as disclosed herein. In some examples, aspects of the operations of 1705 may be performed by an SSCB monitoring manager 1125 as described with reference to FIG. 11.

At 1710, the method may include monitoring a second beam, subsequent to a switching gap following the first multiplexed block, for a second multiplexed block that includes a second SSB that is multiplexed in the frequency domain with a second CORESET, the second multiplexed block including a second set of symbols that each have an associated cyclic prefix, where an initial cyclic prefix of an initial symbol of the second multiplexed block starts after the switching gap. The operations of 1710 may be performed in accordance with examples as disclosed herein. In some examples, aspects of the operations of 1710 may be performed by an SSCB monitoring manager 1125 as described with reference to FIG. 11.

Optionally, at 1715, the method may include determining one or more of a frequency allocation, a bandwidth, or a time duration of at least the first CORESET based on one or more predetermined values or an indication provided in an information block within the first SSB. The operations of 1715 may be performed in accordance with examples as disclosed herein. In some examples, aspects of the operations of 1715 may be performed by a resource allocation manager 1135 as described with reference to FIG. 11.

At 1720, the method may include decoding one or more of the first multiplexed block or the second multiplexed block. The operations of 1720 may be performed in accordance with examples as disclosed herein. In some examples, aspects of the operations of 1720 may be performed by a decoder 1130 as described with reference to FIG. 11.

Figure 18:
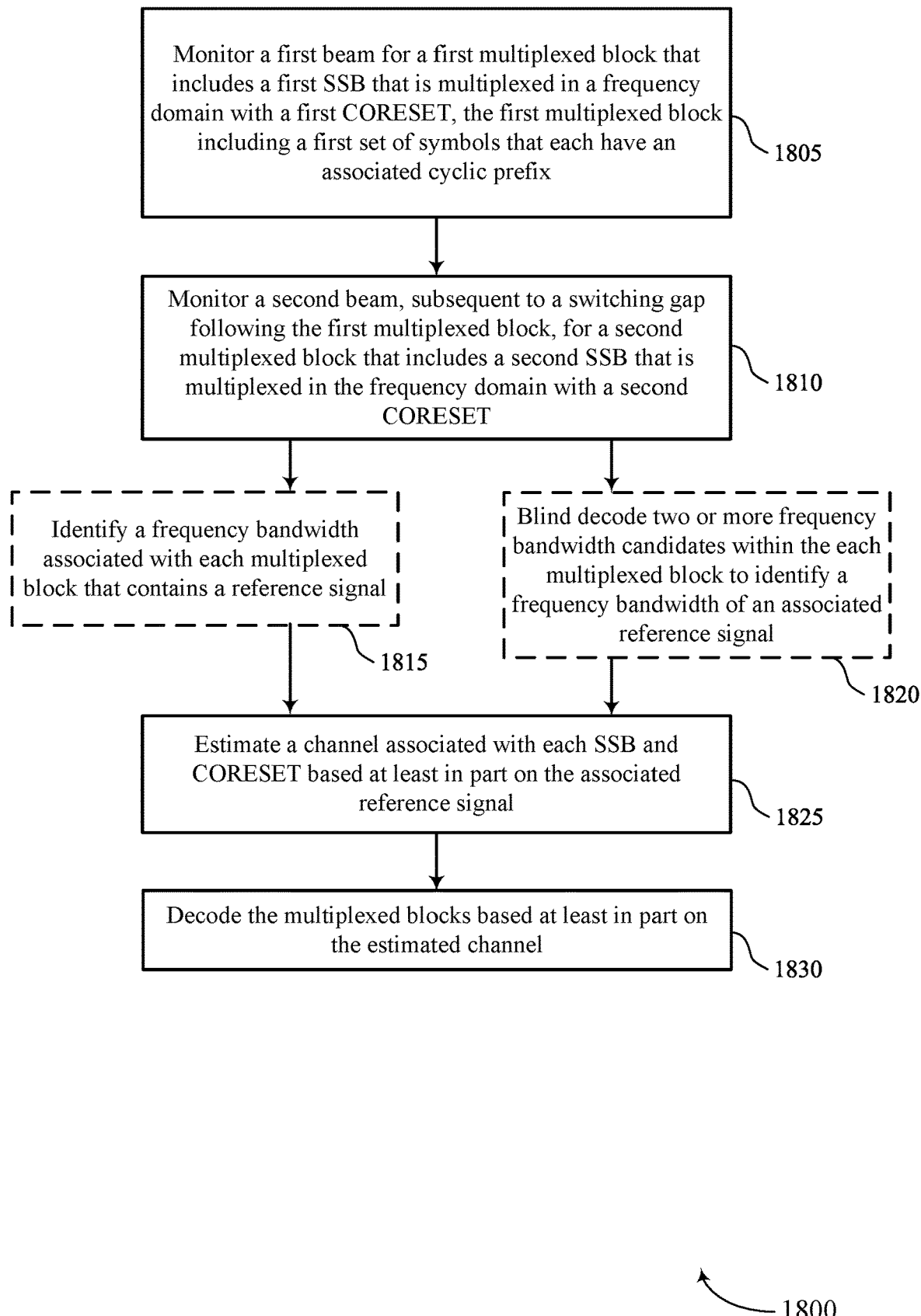

FIG. 18 shows a flowchart illustrating a method 1800 that supports SSB and CORESET multiplexing in wireless communications in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include monitoring a first beam for a first multiplexed block that includes a first SSB that is multiplexed in a frequency domain with a first CORESET, the first multiplexed block including a first set of symbols that each have an associated cyclic prefix. The operations of 1805 may be performed in accordance with examples as disclosed herein. In some examples, aspects of the operations of 1805 may be performed by an SSCB monitoring manager 1125 as described with reference to FIG. 11.

At 1810, the method may include monitoring a second beam, subsequent to a switching gap following the first multiplexed block, for a second multiplexed block that includes a second SSB that is multiplexed in the frequency domain with a second CORESET. The operations of 1810 may be performed in accordance with examples as disclosed herein. In some examples, aspects of the operations of 1810 may be performed by an SSCB monitoring manager 1125 as described with reference to FIG. 11. In some cases, the second multiplexed block includes a second set of symbols that each have an associated cyclic prefix, and an initial cyclic prefix of an initial symbol of the second multiplexed block starts after the switching gap.

Optionally, at 1815, the method may include identifying a frequency bandwidth associated with each multiplexed block that contains a reference signal. The operations of 1815 may be performed in accordance with examples as disclosed herein. In some examples, aspects of the operations of 1815 may be performed by a decoder 1130 as described with reference to FIG. 11. In some cases, the frequency bandwidth may be identified based at least in part on an indication provided by a synchronization signal within the first SSB or the second SSB. In some cases, the frequency bandwidth may be a predetermined frequency bandwidth.

Alternatively, at 1820, the method may include blind decoding two or more frequency bandwidth candidates within each multiplexed block to identify a frequency bandwidth of the associated reference signal. The operations of 1820 may be performed in accordance with examples as disclosed herein. In some examples, aspects of the operations of 1820 may be performed by a reference signal manager 1155 as described with reference to FIG. 11. In some cases, the two or more frequency bandwidth candidates may be a predetermined set of frequency bandwidth candidates associated with the first CORESET and the second CORESET. In some cases, the blind decoding may include decoding expected reference signals based on the frequency bandwidth candidates and which of the frequency bandwidth candidates provides an expected reference signal sequence.

At 1825, the method may include estimating a channel associated with each SSB and CORESET based on the associated reference signal. The operations of 1830 may be performed in accordance with examples as disclosed herein. In some examples, aspects of the operations of 1830 may be performed by a channel estimation manager 1140 as described with reference to FIG. 11. In some cases, the reference signal associated with each multiplexed block spans frequency resources associated with the associated SSB and CORESET. In some cases, the channel associated with each multiplexed block may be estimated based on a reference signal in a dedicated DFT-s-ODFM symbol within the associated multiplexed block. In some cases, the channel associated with each multiplexed block may be estimated based on a reference signal that is located in a subset of subcarriers within a symbol of the associated multiplexed block. In some cases, the channel associated with each multiplexed block may be estimated based on a reference signal that is located in a subset of time domain symbols of a set of time domain symbols that are generated after a FFT and IDFT of one or more received symbols of the associated multiplexed block.

At 1830, the method may include decoding the multiplexed blocks based at least in part on the estimated channel. The operations of 1830 may be performed in accordance with examples as disclosed herein. In some examples, aspects of the operations of 1830 may be performed by a decoder 1130 as described with reference to FIG. 11.

Figure 19:
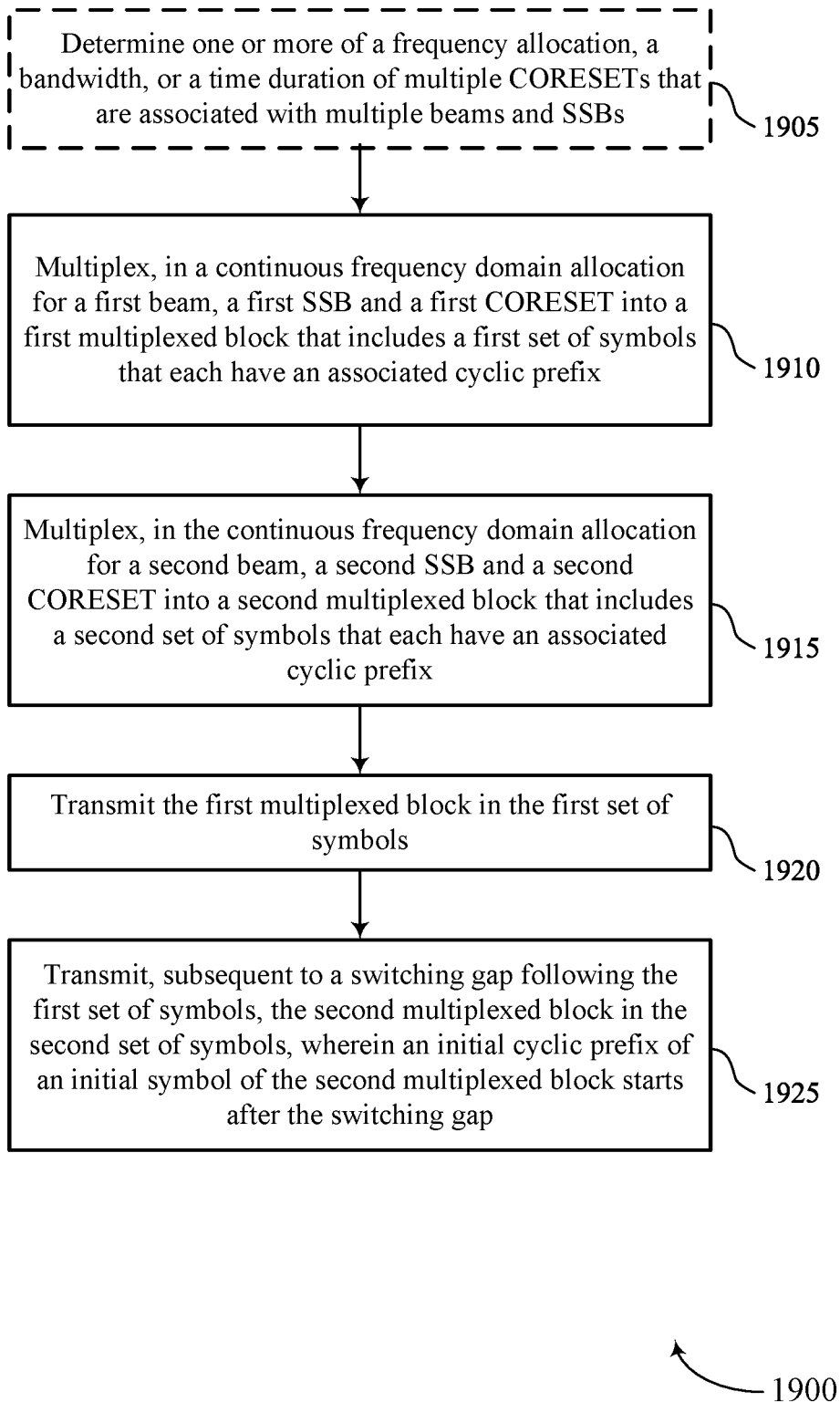

FIG. 19 shows a flowchart illustrating a method 1900 that supports SSB and CORESET multiplexing in wireless communications in accordance with aspects of the present disclosure. The operations of the method 1900 may be implemented by a base station or its components as described herein. For example, the operations of the method 1900 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

Optionally, at 1905, the method may include determining one or more of a frequency allocation, a bandwidth, or a time duration of multiple CORESETs that are associated with multiple beams and SSBs. The operations of 1905 may be performed in accordance with examples as disclosed herein. In some examples, aspects of the operations of 1905 may be performed by an SSCB multiplexing manager 1525 as described with reference to FIG. 15. In some cases, such a determination may be based on one or more predetermined values or an indication provided in an information block within a first SSB. In some cases, multiple SSB and CORESETs may each be associated with a multiplexed block, where the multiple multiplexed blocks are multiplexed in a continuous frequency domain allocation.

At 1910, the method may include multiplexing, in the continuous frequency domain allocation for a first beam, a first SSB and a first CORESET into a first multiplexed block that includes a first set of symbols that each have an associated cyclic prefix. The operations of 1910 may be performed in accordance with examples as disclosed herein. In some examples, aspects of the operations of 1910 may be performed by an SSCB multiplexing manager 1525 as described with reference to FIG. 15.

At 1915, the method may include multiplexing, in the continuous frequency domain allocation for a second beam, a second SSB and a second CORESET into a second multiplexed block that includes a second set of symbols that each have an associated cyclic prefix. The operations of 1915 may be performed in accordance with examples as disclosed herein. In some examples, aspects of the operations of 1915 may be performed by an SSCB multiplexing manager 1525 as described with reference to FIG. 15.

At 1920, the method may include transmitting the first multiplexed block in the first set of symbols. The operations of 1920 may be performed in accordance with examples as disclosed herein. In some examples, aspects of the operations of 1920 may be performed by an SSCB transmission manager 1530 as described with reference to FIG. 15.

At 1925, the method may include transmitting, subsequent to a switching gap following the first set of symbols, the second multiplexed block in the second set of symbols, where an initial cyclic prefix of an initial symbol of the second multiplexed block starts after the switching gap. The operations of 1925 may be performed in accordance with examples as disclosed herein. In some examples, aspects of the operations of 1925 may be performed by an SSCB transmission manager 1530 as described with reference to FIG. 15.

Figure 20:
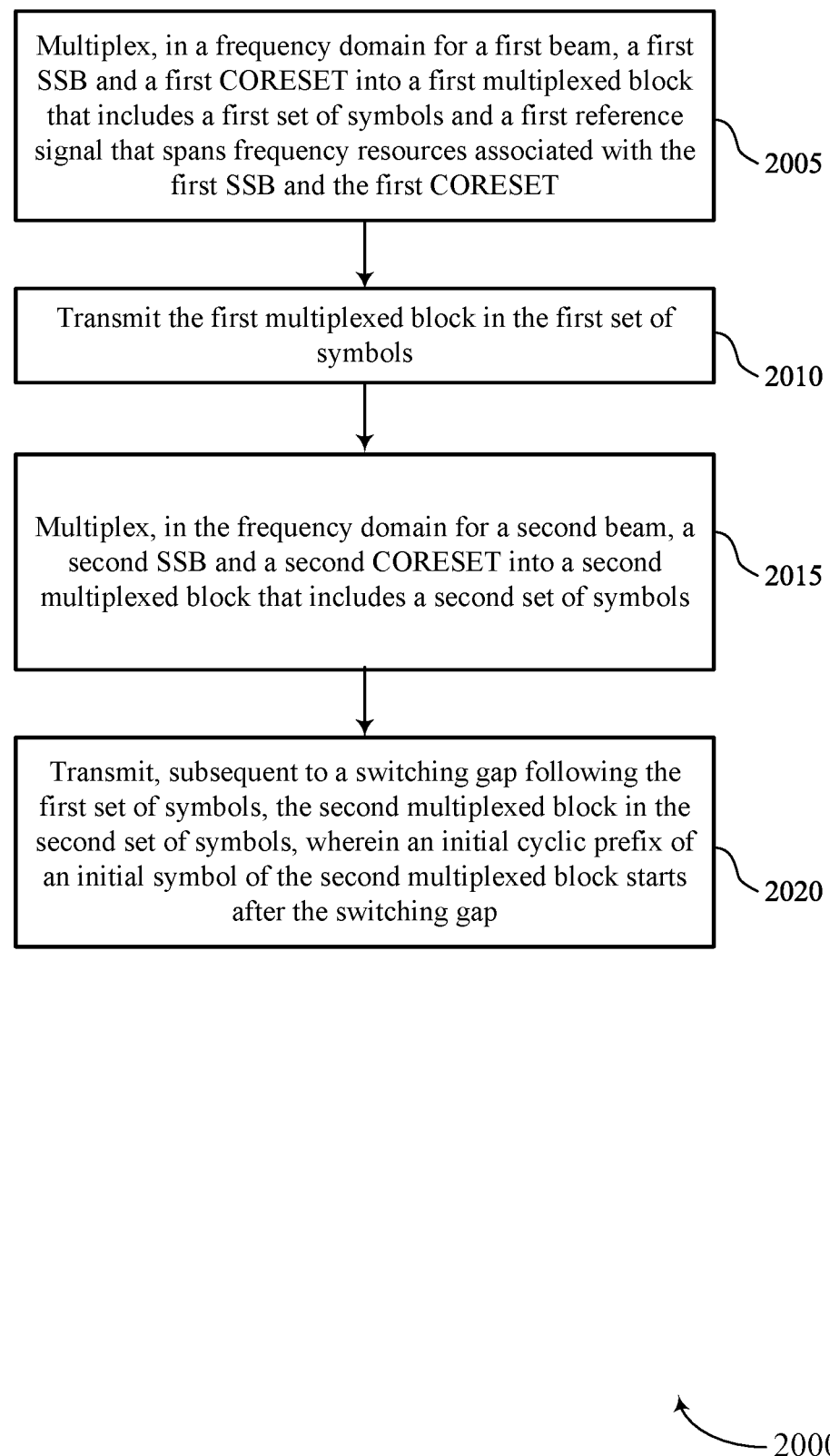

FIG. 20 shows a flowchart illustrating a method 2000 that supports SSB and CORESET multiplexing in wireless communications in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include multiplexing, in a frequency domain for a first beam, a first SSB and a first CORESET into a first multiplexed block that includes a first set of symbols that each have an associated cyclic prefix. The operations of 2005 may be performed in accordance with examples as disclosed herein. In some examples, aspects of the operations of 2005 may be performed by an SSCB multiplexing manager 1525 as described with reference to FIG. 15. In some cases, a first reference signal may be transmitted in the first multiplexed block. In some cases, the first reference signal spans frequency resources associated with the first SSB and the first CORESET. In some cases, a frequency bandwidth may be selected for the first reference signal from two or more available frequency bandwidths within the first multiplexed block. In some cases, an indication of the frequency bandwidth for the first reference signal may be provided in a synchronization signal within the first SSB. In some cases, the reference signal may be transmitted in a dedicated DFT-s-ODFM symbol within the associated multiplexed block, in a subset of subcarriers within one or more symbols of the associated multiplexed block, or in a subset of time domain symbols inserted into a set of time domain symbols prior to a DFT of the associated multiplexed block.

At 2010, the method may include transmitting the first multiplexed block in the first set of symbols. The operations of 2010 may be performed in accordance with examples as disclosed herein. In some examples, aspects of the operations of 2010 may be performed by an SSCB transmission manager 1530 as described with reference to FIG. 15.

At 2015, the method may include multiplexing, in the frequency domain for a second beam, a second SSB and a second CORESET into a second multiplexed block that includes a second set of symbols that each have an associated cyclic prefix. The operations of 2025 may be performed in accordance with examples as disclosed herein. In some examples, aspects of the operations of 2025 may be performed by an SSCB multiplexing manager 1525 as described with reference to FIG. 15.

At 2020, the method may include transmitting, subsequent to a switching gap following the first set of symbols, the second multiplexed block in the second set of symbols, where an initial cyclic prefix of an initial symbol of the second multiplexed block starts after the switching gap. The operations of 2035 may be performed in accordance with examples as disclosed herein. In some examples, aspects of the operations of 2035 may be performed by an SSCB transmission manager 1530 as described with reference to FIG. 15.

The following provides an overview of aspects of the present disclosure:

Aspect 1: A method for wireless communication at a UE, comprising: monitoring a first beam for a first multiplexed block that includes a first synchronization signal block that is multiplexed in a frequency domain with a first control resource set, the first multiplexed block including a first set of symbols that each have an associated cyclic prefix; monitoring a second beam, subsequent to a switching gap following the first multiplexed block, for a second multiplexed block that includes a second synchronization signal block that is multiplexed in the frequency domain with a second control resource set, the second multiplexed block including a second set of symbols that each have an associated cyclic prefix, wherein an initial cyclic prefix of an initial symbol of the second multiplexed block starts after the switching gap; and decoding one or more of the first multiplexed block or the second multiplexed block.

Aspect 2: The method of aspect 1, wherein the first synchronization signal block is transmitted using a first waveform, and the first control resource set is transmitted using a second waveform that is a different waveform than the first waveform.

Aspect 3: The method of aspect 2, wherein the first waveform is an OFDM waveform or a DFT-s-OFDM waveform, and the second waveform is an OFDM waveform or a DFT-s-OFDM waveform.

Aspect 4: The method of any of aspects 1 through 3, further comprising: determining one or more of a frequency allocation, a bandwidth, or a time duration of the first control resource set based at least in part on one or more predetermined values or an indication provided in an information block within the first synchronization signal block.

Aspect 5: The method of any of aspects 1 through 4, wherein each of the first synchronization signal block and the first control resource set, and each of the second synchronization signal block and the second control resource set, are multiplexed in a continuous frequency domain allocation.

Aspect 6: The method of any of aspects 1 through 5, further comprising: estimating a channel associated with the first synchronization signal block and the first control resource set based at least in part on a first reference signal contained in the first multiplexed block, wherein the first reference signal spans frequency resources associated with the first synchronization signal block and the first control resource set.

Aspect 7: The method of aspect 6, wherein the first reference signal spans a fixed frequency bandwidth associated with the first multiplexed block.

Aspect 8: The method of aspect 6, further comprising: blind decoding two or more frequency bandwidth candidates within the first multiplexed block to identify a frequency bandwidth of the first reference signal.

Aspect 9: The method of aspect 6, further comprising: identifying a frequency bandwidth that contains the first reference signal based at least in part on an indication provided by a synchronization signal within the first synchronization signal block.

Aspect 10: The method of aspect 6, wherein the estimating comprises: estimating the channel associated with the first synchronization signal block based on a first portion of the first reference signal that spans a first frequency bandwidth associated with the first synchronization signal block; determining, based at least in part information from the first synchronization signal block, a second frequency bandwidth associated with the first control resource set; and estimating the channel associated with the first control resource set based at least in part on a second portion of the first reference signal that spans the second frequency bandwidth.

Aspect 11: The method of aspect 1, further comprising: estimating a first channel associated with the first synchronization signal block based at least in part on a first reference signal in a first frequency bandwidth associated with the first synchronization signal block; and estimating a second channel associated with the first control resource set based at least in part on a second reference signal in a second frequency bandwidth associated with the first control resource set.

Aspect 12: The method of any of aspects 1 through 11, further comprising: estimating a channel associated with each multiplexed block based at least in part on a reference signal in a dedicated DFT-s-ODFM symbol within the associated multiplexed block.

Aspect 13: The method of any of aspects 1 through 11, further comprising: estimating a channel associated with each multiplexed block based at least in part on a reference signal that is located in a subset of subcarriers within a symbol of the associated multiplexed block.

Aspect 14: The method of any of aspects 1 through 11, further comprising: estimating a channel associated with each multiplexed block based at least in part on a reference signal that is located in a subset of time domain symbols of a set of time domain symbols that are generated after a FFT and IDFT of one or more received symbols of the associated multiplexed block.

Aspect 15: A method for wireless communication at a base station, comprising: multiplexing, in a frequency domain for a first beam, a first synchronization signal block and a first control resource set into a first multiplexed block that includes a first set of symbols that each have an associated cyclic prefix; multiplexing, in the frequency domain for a second beam, a second synchronization signal block and a second control resource set into a second multiplexed block that includes a second set of symbols that each have an associated cyclic prefix; transmitting the first multiplexed block in the first set of symbols; and transmitting, subsequent to a switching gap following the first set of symbols, the second multiplexed block in the second set of symbols, wherein an initial cyclic prefix of an initial symbol of the second multiplexed block starts after the switching gap.

Aspect 16: The method of aspect 15, wherein the first synchronization signal block is transmitted using a first waveform, and the first control resource set is transmitted using a second waveform that is a different waveform than the first waveform, and wherein the first waveform is an OFDM waveform or a DFT-s-OFDM waveform, and the second waveform is an OFDM waveform or a DFT-s-OFDM waveform.

Aspect 17: The method of any of aspects 15 through 16, further comprising: determining one or more of a frequency allocation, a bandwidth, or a time duration of the first control resource set based at least in part on one or more predetermined values or an indication provided in an information block within the first synchronization signal block, and wherein the associated synchronization signal block and control resource set of each associated multiplexed block are multiplexed in a continuous frequency domain allocation.

Aspect 18: The method of any of aspects 15 through 17, wherein the transmitting the first multiplexed block further comprises: transmitting a first reference signal in the first multiplexed block, wherein the first reference signal spans frequency resources associated with the first synchronization signal block and the first control resource set.

Aspect 19: The method of aspect 18, wherein the first reference signal spans a fixed frequency bandwidth associated with the first multiplexed block.

Aspect 20: The method of aspect 18, further comprising: selecting a frequency bandwidth for the first reference signal from two or more blind decoding frequency bandwidth candidates within the first multiplexed block.

Aspect 21: The method of aspect 18, further comprising: selecting a frequency bandwidth for the first reference signal from two or more available frequency bandwidths within the first multiplexed block; and transmitting an indication of the frequency bandwidth for the first reference signal in a synchronization signal within the first synchronization signal block.

Aspect 22: The method of aspect 15, wherein the transmitting the first multiplexed block further comprises: transmitting a first reference signal in a first frequency bandwidth associated with the first synchronization signal block; and transmitting a second reference signal in a second frequency bandwidth associated with the first control resource set.

Aspect 23: The method of any of aspects 15 through 22, further comprising: transmitting a reference signal in each multiplexed block, wherein the reference signal is transmitted in: a dedicated DFT-s-ODFM symbol within the associated multiplexed block, a subset of subcarriers within one or more symbols of the associated multiplexed block, or a subset of time domain symbols inserted into a set of time domain symbols prior to a discrete Fourier transform of the associated multiplexed block.

Aspect 24: An apparatus for wireless communication at a UE, comprising a processor; memory coupled with the processor; and instructions stored in the memory and executable by the processor to cause the apparatus to perform a method of any of aspects 1 through 14.

Aspect 25: An apparatus for wireless communication at a UE, comprising at least one means for performing a method of any of aspects 1 through 14.

Aspect 26: A non-transitory computer-readable medium storing code for wireless communication at a UE, the code comprising instructions executable by a processor to perform a method of any of aspects 1 through 14.

Aspect 27: An apparatus for wireless communication at a base station, comprising a processor; memory coupled with the processor; and instructions stored in the memory and executable by the processor to cause the apparatus to perform a method of any of aspects 15 through 23.

Aspect 28: An apparatus for wireless communication at a base station, comprising at least one means for performing a method of any of aspects 15 through 23.

Aspect 29: A non-transitory computer-readable medium storing code for wireless communication at a base station, the code comprising instructions executable by a processor to perform a method of any of aspects 15 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    monitoring a first beam for a first multiplexed block that includes a first synchronization signal block that is multiplexed in a frequency domain with a first control resource set, the first multiplexed block including a first set of symbols that each have an associated cyclic prefix;
    estimating a channel associated with the first synchronization signal block and the first control resource set based at least in part on a first reference signal contained in the first multiplexed block, wherein the first reference signal spans frequency resources associated with the first synchronization signal block and the first control resource set;
    monitoring a second beam, subsequent to a switching gap following the first multiplexed block, for a second multiplexed block that includes a second synchronization signal block that is multiplexed in the frequency domain with a second control resource set, the second multiplexed block including a second set of symbols that each have an associated cyclic prefix, wherein an initial cyclic prefix of an initial symbol of the second multiplexed block starts after the switching gap; and
    decoding one or more of the first multiplexed block or the second multiplexed block.

2. The method of claim 1, wherein the first synchronization signal block is transmitted using a first waveform, and the first control resource set is transmitted using a second waveform that is a different waveform than the first waveform.

3. The method of claim 2, wherein the first waveform is an orthogonal frequency division multiplexing (OFDM) waveform or a discrete Fourier transform spread OFDM (DFT-s-OFDM) waveform, and the second waveform is an OFDM waveform or a DFT-s-OFDM waveform.

4. The method of claim 1, further comprising:
    determining one or more of a frequency allocation, a bandwidth, or a time duration of the first control resource set based at least in part on one or more predetermined values or an indication provided in an information block within the first synchronization signal block.

5. The method of claim 1, wherein each of the first synchronization signal block and the first control resource set, and each of the second synchronization signal block and the second control resource set, are multiplexed in a continuous frequency domain allocation.

6. The method of claim 1, wherein the first reference signal spans a fixed frequency bandwidth associated with the first multiplexed block.

7. The method of claim 1, further comprising:
    blind decoding two or more frequency bandwidth candidates within the first multiplexed block to identify a frequency bandwidth of the first reference signal.

8. The method of claim 1, further comprising:
    identifying a frequency bandwidth that contains the first reference signal based at least in part on an indication provided by a synchronization signal within the first synchronization signal block.

9. The method of claim 1, wherein the estimating comprises:
    estimating the channel associated with the first synchronization signal block based on a first portion of the first reference signal that spans a first frequency bandwidth associated with the first synchronization signal block;
    determining, based at least in part information from the first synchronization signal block, a second frequency bandwidth associated with the first control resource set; and
    estimating the channel associated with the first control resource set based at least in part on a second portion of the first reference signal that spans the second frequency bandwidth.

10. The method of claim 1, wherein:
    the first reference signal is transmitted via a dedicated discrete Fourier transmission spread orthogonal frequency division multiplexing (DFT-s-ODFM) symbol within the first multiplexed block.

11. The method of claim 1, wherein:
    the first reference signal is located in a subset of subcarriers within a symbol of the first multiplexed block.

12. The method of claim 1, wherein:
    the first reference signal that is located in a subset of time domain symbols of a set of time domain symbols that are generated after a fast Fourier transform (FFT) and inverse discrete Fourier transform of one or more received symbols of the first multiplexed block.

13. A method for wireless communication at an access network entity, comprising:
    multiplexing, in a frequency domain for a first beam, a first synchronization signal block and a first control resource set into a first multiplexed block that includes a first set of symbols that each have an associated cyclic prefix;
    multiplexing, in the frequency domain for a second beam, a second synchronization signal block and a second control resource set into a second multiplexed block that includes a second set of symbols that each have an associated cyclic prefix;
    transmitting the first multiplexed block in the first set of symbols, the first multiplexed block including a first reference signal that spans frequency resources associated with the first synchronization signal block and the first control resource set; and
    transmitting, subsequent to a switching gap following the first set of symbols, the second multiplexed block in the second set of symbols, wherein an initial cyclic prefix of an initial symbol of the second multiplexed block starts after the switching gap.

14. The method of claim 13, wherein the first synchronization signal block is transmitted using a first waveform, and the first control resource set is transmitted using a second waveform that is a different waveform than the first waveform, and wherein the first waveform is an orthogonal frequency division multiplexing (OFDM) waveform or a discrete Fourier transform spread OFDM (DFT-s-OFDM) waveform, and the second waveform is an OFDM waveform or a DFT-s-OFDM waveform.

15. The method of claim 13, further comprising:
    determining one or more of a frequency allocation, a bandwidth, or a time duration of the first control resource set based at least in part on one or more predetermined values or an indication provided in an information block within the first synchronization signal block, and wherein the associated synchronization signal block and control resource set of each associated multiplexed block are multiplexed in a continuous frequency domain allocation.

16. The method of claim 13, wherein the first reference signal spans a fixed frequency bandwidth associated with the first multiplexed block.

17. The method of claim 13, further comprising:
selecting a frequency bandwidth for the first reference signal from two or more blind decoding frequency bandwidth candidates within the first multiplexed block.

18. The method of claim 13, further comprising:
selecting a frequency bandwidth for the first reference signal from two or more available frequency bandwidths within the first multiplexed block; and
transmitting an indication of the frequency bandwidth for the first reference signal in a synchronization signal within the first synchronization signal block.

19. The method of claim 13,
wherein the first reference signal is transmitted in:
a dedicated discrete Fourier transmission spread orthogonal frequency division multiplexing (DFT-s-ODFM) symbol within the first multiplexed block,
a subset of subcarriers within one or more symbols of the first multiplexed block, or
a subset of time domain symbols inserted into a set of time domain symbols prior to a discrete Fourier transform of the first multiplexed block.

20. An apparatus for wireless communication at a user equipment (UE), comprising:
a processor;
memory coupled with the processor; and
instructions stored in the memory and executable by the processor to cause the apparatus to:
monitor a first beam for a first multiplexed block that includes a first synchronization signal block that is multiplexed in a frequency domain with a first control resource set, the first multiplexed block including a first set of symbols that each have an associated cyclic prefix;
estimate a channel associated with the first synchronization signal block and the first control resource set based at least in part on a first reference signal contained in the first multiplexed block, wherein the first reference signal spans frequency resources associated with the first synchronization signal block and the first control resource set;
monitor a second beam, subsequent to a switching gap following the first multiplexed block, for a second multiplexed block that includes a second synchronization signal block that is multiplexed in the frequency domain with a second control resource set, the second multiplexed block including a second set of symbols that each have an associated cyclic prefix, wherein an initial cyclic prefix of an initial symbol of the second multiplexed block starts after the switching gap; and
decode one or more of the first multiplexed block or the second multiplexed block.

21. The apparatus of claim 20, wherein the first synchronization signal block is transmitted using a first waveform, and the first control resource set is transmitted using a second waveform that is a different waveform than the first waveform, and wherein the first waveform is an orthogonal frequency division multiplexing (OFDM) waveform or a discrete Fourier transform spread OFDM (DFT-s-OFDM) waveform, and the second waveform is an OFDM waveform or a DFT-s-OFDM waveform.

22. The apparatus of claim 20, wherein:
the first reference signal is located in a dedicated discrete Fourier transmission spread orthogonal frequency division multiplexing (DFT-s-ODFM) symbol within the first multiplexed block,
the first reference signal is located in a subset of subcarriers within a symbol of the first multiplexed block, or
the first reference signal is located in a subset of time domain symbols of a set of time domain symbols that are generated after a fast Fourier transform (FFT) and inverse discrete Fourier transform of one or more received symbols of the first multiplexed block.

23. An apparatus for wireless communication at an access network entity, comprising:
a processor;
memory coupled with the processor; and
instructions stored in the memory and executable by the processor to cause the apparatus to:
multiplexing, in a frequency domain for a first beam, a first synchronization signal block and a first control resource set into a first multiplexed block that includes a first set of symbols that each have an associated cyclic prefix;
multiplexing, in the frequency domain for a second beam, a second synchronization signal block and a second control resource set into a second multiplexed block that includes a second set of symbols that each have an associated cyclic prefix;
transmit the first multiplexed block in the first set of symbols, the first multiplexed block including a first reference signal that spans frequency resources associated with the first synchronization signal block and the first control resource set; and
transmit, subsequent to a switching gap following the first set of symbols, the second multiplexed block in the second set of symbols, wherein an initial cyclic prefix of an initial symbol of the second multiplexed block starts after the switching gap.

24. The apparatus of claim 23, wherein the first synchronization signal block is transmitted using a first waveform, and the first control resource set is transmitted using a second waveform that is a different waveform than the first waveform, and wherein the first waveform is an orthogonal frequency division multiplexing (OFDM) waveform or a discrete Fourier transform spread OFDM (DFT-s-OFDM) waveform, and the second waveform is an OFDM waveform or a DFT-s-OFDM waveform.

* * * * *